US010535902B2

(12) United States Patent
Laramie et al.

(10) Patent No.: US 10,535,902 B2
(45) Date of Patent: Jan. 14, 2020

(54) PROTECTIVE LAYERS FOR ELECTROCHEMICAL CELLS

(71) Applicants: Sion Power Corporation, Tucson, AZ (US); BASF SE, Ludwigshafen (DE)

(72) Inventors: Michael G. Laramie, Tucson, AZ (US); Yuriy V. Mikhaylik, Tucson, AZ (US); Hui Du, Tucson, AZ (US); Joern Kulisch, Eppelheim (DE); Marina Safont-Sempere, Ludwigshafen (DE); Klaus Leitner, Ludwigshafen (DE); Holger Schneider, Ludwigshafen (DE)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 221 days.

(21) Appl. No.: 15/277,244

(22) Filed: Sep. 27, 2016

(65) Prior Publication Data
US 2017/0018815 A1 Jan. 19, 2017

Related U.S. Application Data

(63) Continuation of application No. 15/160,191, filed on May 20, 2016.
(Continued)

(51) Int. Cl.
*H01M 10/42* (2006.01)
*H01M 2/14* (2006.01)
(Continued)

(52) U.S. Cl.
CPC .......... *H01M 10/4235* (2013.01); *B05D 1/12* (2013.01); *H01M 2/145* (2013.01); *H01M 2/166* (2013.01);
(Continued)

(58) Field of Classification Search
CPC ........... H01M 2/1653; H01M 10/4235; H01M 10/052; H01M 4/0471; H01M 4/0419;
(Continued)

(56) References Cited

U.S. PATENT DOCUMENTS 4,664,991 A 5/1987 Perichaud et al.
4,739,018 A 4/1988 Armand et al.
(Continued)

FOREIGN PATENT DOCUMENTS

JP S61-208750 A 9/1986
JP 63-126156 5/1988
(Continued)

OTHER PUBLICATIONS

Extended European Search Report for EP 16170592.6 dated Jul. 27, 2016.
(Continued)

*Primary Examiner* — Ula C Ruddock
*Assistant Examiner* — Matthew W Van Oudenaren
(74) *Attorney, Agent, or Firm* — Wood, Greenfield & Sacks, P.C.

(57) ABSTRACT

Articles and methods including layers for protection of electrodes in electrochemical cells are provided. As described herein, a layer, such as a protective layer for an electrode, may comprise a plurality of particles (e.g., crystalline inorganic particles, amorphous inorganic particles). In some embodiments, at least a portion of the plurality of particles (e.g., inorganic particles) are fused to one another. For instance, in some embodiments, the layer may be formed by aerosol deposition or another suitable process that involves subjecting the particles to a relatively high velocity such that fusion of particles occurs during deposition. In some embodiments, the layer (e.g., the layer comprising a plurality of particles) is an ion-conducting layer.

30 Claims, 11 Drawing Sheets

Related U.S. Application Data

(60) Provisional application No. 62/164,200, filed on May 20, 2015.

(51) Int. Cl.
*H01M 4/04* (2006.01)
*B05D 1/12* (2006.01)
*H01M 2/16* (2006.01)
*H01M 4/36* (2006.01)
*H01M 10/052* (2010.01)

(52) U.S. Cl.
CPC ....... *H01M 2/1646* (2013.01); *H01M 2/1653* (2013.01); *H01M 2/1686* (2013.01); *H01M 4/0419* (2013.01); *H01M 4/0471* (2013.01); *H01M 4/366* (2013.01); *H01M 10/052* (2013.01)

(58) Field of Classification Search
CPC .... H01M 4/366; H01M 2/1646; H01M 2/145; H01M 2/166; H01M 2/1686; B05D 1/12
See application file for complete search history.

(56) References Cited

U.S. PATENT DOCUMENTS

| | | | |
|---|---|---|---|
| 4,833,048 A | 5/1989 | Dejonghe et al. | |
| 4,917,974 A | 4/1990 | Dejonghe et al. | |
| 4,954,371 A | 9/1990 | Yializis | |
| 5,162,175 A | 11/1992 | Visco et al. | |
| 5,194,341 A | 3/1993 | Bagley et al. | |
| 5,314,765 A | 5/1994 | Bates et al. | |
| 5,324,599 A | 6/1994 | Oyama et al. | |
| 5,366,829 A | 11/1994 | Saidi | |
| 5,387,479 A | 2/1995 | Koksbang | |
| 5,415,954 A | 5/1995 | Gauthier | |
| 5,434,021 A | 7/1995 | Fauteux et al. | |
| 5,441,831 A | 8/1995 | Okamoto et al. | |
| 5,460,905 A | 10/1995 | Skotheim | |
| 5,462,566 A | 10/1995 | Skotheim | |
| 5,487,959 A | 1/1996 | Koksbang et al. | |
| 5,516,598 A | 5/1996 | Visco et al. | |
| 5,529,860 A | 6/1996 | Skotheim et al. | |
| 5,538,812 A | 6/1996 | Lee et al. | |
| 5,532,083 A | 7/1996 | McCullough | |
| 5,569,520 A | 10/1996 | Bates | |
| 5,601,947 A | 2/1997 | Skotheim et al. | |
| 5,648,187 A | 7/1997 | Skothiem et al. | |
| 5,681,615 A | 10/1997 | Affinito et al. | |
| 5,690,702 A | 11/1997 | Skotheim et al. | |
| 5,716,736 A | 2/1998 | Zhang et al. | |
| 5,723,230 A | 3/1998 | Naoi et al. | |
| 5,731,104 A | 3/1998 | Ventura et al. | |
| 5,783,330 A | 7/1998 | Naoi et al. | |
| 5,792,575 A | 8/1998 | Naoi et al. | |
| 5,824,434 A | 10/1998 | Kawakami et al. | |
| 5,834,137 A | 11/1998 | Zhang et al. | |
| 5,882,819 A | 3/1999 | Naoi et al. | |
| 5,961,672 A | 10/1999 | Skothiem et al. | |
| 6,025,094 A | 2/2000 | Visco et al. | |
| 6,066,417 A | 5/2000 | Cho et al. | |
| 6,117,590 A | 9/2000 | Skotheim et al. | |
| 6,153,337 A | 11/2000 | Carlson et al. | |
| 6,156,395 A | 12/2000 | Zhang et al. | |
| 6,183,901 B1 | 2/2001 | Ying et al. | |
| 6,201,100 B1 | 3/2001 | Gorkovenko et al. | |
| 6,202,591 B1 | 3/2001 | Witzman et al. | |
| 6,203,947 B1 | 3/2001 | Peled et al. | |
| 6,225,002 B1 | 5/2001 | Nimon et al. | |
| 6,268,695 B1 | 7/2001 | Affinito | |
| 6,276,355 B1 | 8/2001 | Zhang et al. | |
| 6,277,514 B1 | 8/2001 | Ying et al. | |
| 6,284,412 B1 | 9/2001 | Minakata et al. | |
| 6,328,770 B1 | 12/2001 | Gozdz | |
| 6,395,423 B1 | 5/2002 | Kawakami et al. | |
| 6,413,285 B1 | 7/2002 | Chu et al. | |
| 6,508,921 B1 | 1/2003 | Mu et al. | |
| 6,517,968 B2 | 2/2003 | Johnson et al. | |
| 6,570,325 B2 | 5/2003 | Graff et al. | |
| 6,770,187 B1 | 8/2004 | Putter et al. | |
| 6,797,428 B1 | 9/2004 | Skotheim et al. | |
| 6,835,493 B2 | 12/2004 | Zhang et al. | |
| 6,849,702 B2 | 2/2005 | Callahan et al. | |
| 6,852,139 B2 | 2/2005 | Zhang et al. | |
| 6,886,240 B2 | 5/2005 | Zhang et al. | |
| 7,204,862 B1 | 4/2007 | Zhang et al. | |
| 7,247,408 B2 | 7/2007 | Skotheim et al. | |
| 7,553,590 B2 | 6/2009 | Mikhaylik | |
| 7,771,870 B2 | 8/2010 | Affinito et al. | |
| 7,785,730 B2 | 8/2010 | Affinito et al. | |
| 8,076,024 B2 | 12/2011 | Affinito et al. | |
| 8,105,717 B2 | 1/2012 | Skotheim et al. | |
| 8,197,971 B2 | 6/2012 | Skotheim et al. | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 9,040,201 B2 | 5/2015 | Affinito et al. | |
| 9,065,149 B2 | 6/2015 | Skotheim et al. | |
| 9,397,342 B2 | 7/2016 | Skotheim et al. | |
| 9,825,328 B2 | 11/2017 | Du et al. | |
| 9,947,963 B2 | 4/2018 | Du et al. | |
| 2001/0041294 A1 | 11/2001 | Chu et al. | |
| 2002/0034688 A1 | 3/2002 | Chu et al. | |
| 2002/0071989 A1 | 6/2002 | Verma | |
| 2003/0224234 A1 | 12/2003 | Steele et al. | |
| 2004/0142244 A1 | 7/2004 | Visco et al. | |
| 2004/0175621 A1 | 9/2004 | Iriyama et al. | |
| 2004/0197641 A1 | 10/2004 | Visco et al. | |
| 2005/0051763 A1 | 3/2005 | Affinito et al. | |
| 2005/0089757 A1 | 4/2005 | Bannai et al. | |
| 2005/0095504 A1 | 5/2005 | Kim et al. | |
| 2005/0100793 A1 | 5/2005 | Jonghe et al. | |
| 2005/0186469 A1 | 8/2005 | De Jonghe et al. | |
| 2005/0208353 A1 | 9/2005 | Johnson | |
| 2005/0255385 A1* | 11/2005 | Harrup | H01M 6/168 429/328 |
| 2006/0159997 A1* | 7/2006 | Sunagawa | H01M 4/0404 429/233 |
| 2006/0222954 A1 | 10/2006 | Skotheim | |
| 2007/0117007 A1 | 5/2007 | Visco et al. | |
| 2007/0172739 A1 | 7/2007 | Visco | |
| 2007/0212583 A1 | 9/2007 | Johnson | |
| 2007/0221265 A1 | 9/2007 | Affinito et al. | |
| 2008/0014501 A1 | 1/2008 | Skotheim et al. | |
| 2008/0057397 A1 | 3/2008 | Skotheim et al. | |
| 2008/0070087 A1 | 3/2008 | Johnson | |
| 2008/0213672 A1 | 9/2008 | Skotheim et al. | |
| 2009/0191431 A1 | 7/2009 | Washima et al. | |
| 2010/0104948 A1 | 4/2010 | Skotheim et al. | |
| 2010/0330410 A1 | 12/2010 | Takahashi et al. | |
| 2011/0014524 A1 | 1/2011 | Skotheim et al. | |
| 2011/0159376 A1 | 6/2011 | Skotheim et al. | |
| 2011/0165471 A9 | 7/2011 | Skotheim et al. | |
| 2011/0200863 A1 | 8/2011 | Xiao et al. | |
| 2011/0200868 A1 | 8/2011 | Klaassen | |
| 2012/0231321 A1 | 9/2012 | Huang et al. | |
| 2012/0276449 A1 | 11/2012 | Skotheim et al. | |
| 2013/0026409 A1 | 1/2013 | Baker et al. | |
| 2013/0095380 A1 | 4/2013 | Affinito et al. | |
| 2013/0143096 A1 | 6/2013 | Affinito et al. | |
| 2013/0327704 A1 | 12/2013 | Wu et al. | |
| 2014/0170465 A1 | 6/2014 | Visco et al. | |
| 2014/0170504 A1 | 6/2014 | Baek et al. | |
| 2015/0086837 A1 | 3/2015 | Laramie et al. | |
| 2015/0287986 A1 | 10/2015 | Affinito et al. | |
| 2015/0333314 A1 | 11/2015 | Pirk et al. | |
| 2016/0344067 A1 | 11/2016 | Laramie et al. | |

(56) References Cited

U.S. PATENT DOCUMENTS

| | | | |
|---|---|---|---|
| 2017/0149086 A1 | 5/2017 | Du et al. | |
| 2017/0338475 A1 | 11/2017 | Laramie et al. | |

FOREIGN PATENT DOCUMENTS

| | | |
|---|---|---|
| JP | 4-028172 | 1/1992 |
| JP | 6-030246 | 2/1994 |
| JP | 09-279357 | 10/1997 |
| JP | 2003-077461 A | 3/2003 |
| JP | 2003-217574 A | 7/2003 |
| JP | 2004-087251 A | 3/2004 |
| JP | 2005-174924 A | 6/2005 |
| JP | 2008-021424 A | 1/2008 |
| JP | 2008-234843 A | 10/2008 |
| KR | 2002-0085422 A | 11/2002 |
| WO | WO 97/01870 A1 | 1/1997 |
| WO | WO 97/44840 | 11/1997 |
| WO | WO 99/19931 A1 | 4/1999 |
| WO | WO 99/33125 | 7/1999 |
| WO | WO 99/57770 A1 | 11/1999 |
| WO | WO 01/33651 A1 | 5/2001 |
| WO | WO 01/39302 | 5/2001 |
| WO | WO 01/39303 | 5/2001 |
| WO | WO 01/97304 | 12/2001 |
| WO | WO 02/071989 A1 | 9/2002 |
| WO | WO 03/100888 A1 | 12/2003 |
| WO | WO 2004/036669 A2 | 4/2004 |
| WO | WO 2005/038953 | 4/2005 |

OTHER PUBLICATIONS

International Search Report and Written Opinion for PCT/US2016/033456 dated Sep. 12, 2016.
Bhattacharyya et al., Second Phase Effects on the Conductivity of Non-Aqueous Salt Solutions: "Soggy Sand Electrolytes". Advanced Materials. 2004;16:811-814.
Pfaffenhuber, Short and Long Range Transport Effects in Salt Containing Solid-Liquid Composites. Thesis. Max Planck Institute. Mar. 2014.
Pfannkuch, On the Correlation of Electrical Conductivity Properties of Porous Systems with Viscous Flow Transport Coefficients. Developments in Soil Science: Fundamentals of Transport Phenomena in Porous Media. 1972;2:42-54.
Revil et al., Theory of ionic-surface electrical conduction in porous media. Physical Review B. Jan. 1997;55(3):1757-73.
U.S. Appl. No. 15/953,734, filed Apr. 16, 2018, Laramie et al.
U.S. Appl. No. 15/915,309, filed Mar. 8, 2018, Du et al.

* cited by examiner

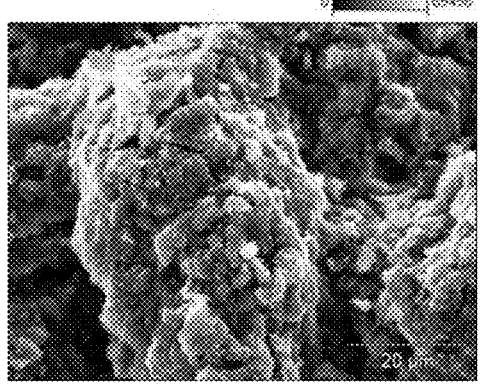
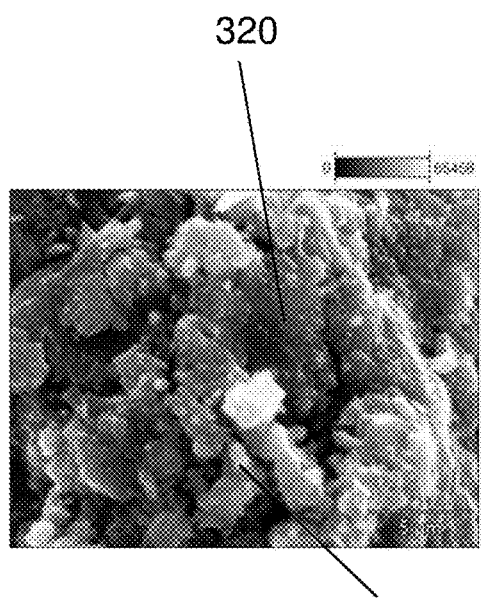
FIG. 6A
FIG. 6B

PROTECTIVE LAYERS FOR ELECTROCHEMICAL CELLS

RELATED APPLICATIONS

This application is a continuation of U.S. patent application Ser. No. 15/160,191, filed May 20, 2016, which claims priority under 35 U.S.C. § 119(e) to U.S. Provisional Patent Application Ser. No. 62/164,200, filed May 20, 2015, each of which is incorporated herein by reference in its entirety for all purposes.

FIELD

Articles and methods including ion-conductive layers, e.g., for protection of electrodes in electrochemical cells, are provided.

BACKGROUND

One of the factors that decreases cycle life in lithium- (or other alkali metal- or alkali earth metal-) based batteries is the consumption of electrolyte during cycling of the battery due to reaction of metallic lithium present in the electrodes with the electrolyte. In order to minimize, or substantially prevent, this reaction and consequently increase the cycle life of the cell, it is desirable to isolate the metallic lithium from the electrolyte. This often times involves the use of a lithium ion conductive material layer coated on the surface of the metallic lithium. This material allows lithium ions to diffuse to and from the metallic lithium surface while excluding the electrolyte from contacting the lithium surface, therefore preventing any side reactions between lithium and the electrolyte. Although certain protective structures have been fabricated, improvements in the protective structures for lithium and other alkali metal electrodes would be beneficial and would have application in a number of different fields involving the use of such batteries and electrodes.

SUMMARY

Articles and methods including ion-conductive layers for protection of electrodes in electrochemical cells, are provided. In certain embodiments, electrode structures and/or methods for making electrode structures including an anode comprising lithium metal or a lithium metal alloy and an ion-conductive layer including a plurality of particles (e.g., fused inorganic particles) described herein are provided. The subject matter disclosed herein involves, in some cases, interrelated products, alternative solutions to a particular problem, and/or a plurality of different uses of one or more systems and/or articles.

In one set of embodiments, a series of articles are provided. In one embodiment, an article for use in an electrochemical cell comprises a first layer and a second layer disposed on the first layer, wherein the second layer comprises a plurality of particles, and wherein the second layer is substantially non-porous. The plurality of particles comprise an ionically conductive material. At least a portion of the plurality of particles are at least partially embedded within the first layer. At least a portion of the plurality of particles are fused to one another. The second layer has an ionic conductivity between about $10^{-6}$ S/cm and about $10^{-2}$ S/cm. The second layer has an average thickness between about 0.5 microns and about 50 microns.

In another embodiment, an article for use in an electrochemical cell comprises a first layer and a second layer disposed on the first layer, wherein the second layer comprises an ionically conductive material and a non-ionically conductive material. At least a portion of the ionically conductive material is crystalline. The ionically conductive material is present in the second layer in an amount greater than 85 wt % of the second layer. The second layer has an ionic conductivity between about $10^{-6}$ S/cm and about $10^{-2}$ S/cm. The second layer has an average thickness between about 0.5 microns and about 50 microns.

In another set of embodiments, electrochemical cells are provided. In one embodiment, an electrochemical cell comprises a first layer and a second layer disposed on the first layer, wherein the second layer comprises a plurality of particles having a particle size of greater than 0.5 microns, wherein the plurality of particles comprise an ionically conductive material. The second layer has an ionic conductivity between about $10^{-6}$ S/cm and about $10^{-2}$ S/cm. The second layer has an average thickness between about 0.5 microns and about 50 microns. The electrochemical cell also includes a liquid electrolyte. The second layer is substantially impermeable to the liquid electrolyte.

In another set of embodiments, a series of methods are provided. In one embodiment, a method of forming an article for use in an electrochemical cell is provided. The method comprises exposing a first layer comprising a first material to a plurality of particles having a velocity of at least 200 m/s, wherein the particles comprise a second material different from the first material. The method also involves embedding at least a portion of the particles in the first layer, and forming a second layer comprising the second material, wherein the second layer has an ionic conductivity between about $10^{-6}$ S/cm and about $10^{-2}$ S/cm.

In another embodiment, a method of forming an article for use in an electrochemical cell comprises exposing a first layer comprising a first material to a plurality of particles having a velocity sufficient to cause fusion of at least some of the particles, wherein the particles comprise a second material. The method involves embedding at least a portion of the particles in the first layer, and forming a second layer comprising the second material, wherein the second layer has an ionic conductivity between about $10^{-6}$ S/cm and about $10^{-2}$ S/cm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 6A-6B show top-down SEM views of an ion-conductive layer, according to one set of embodiments.

DETAILED DESCRIPTION

Figure 1A:
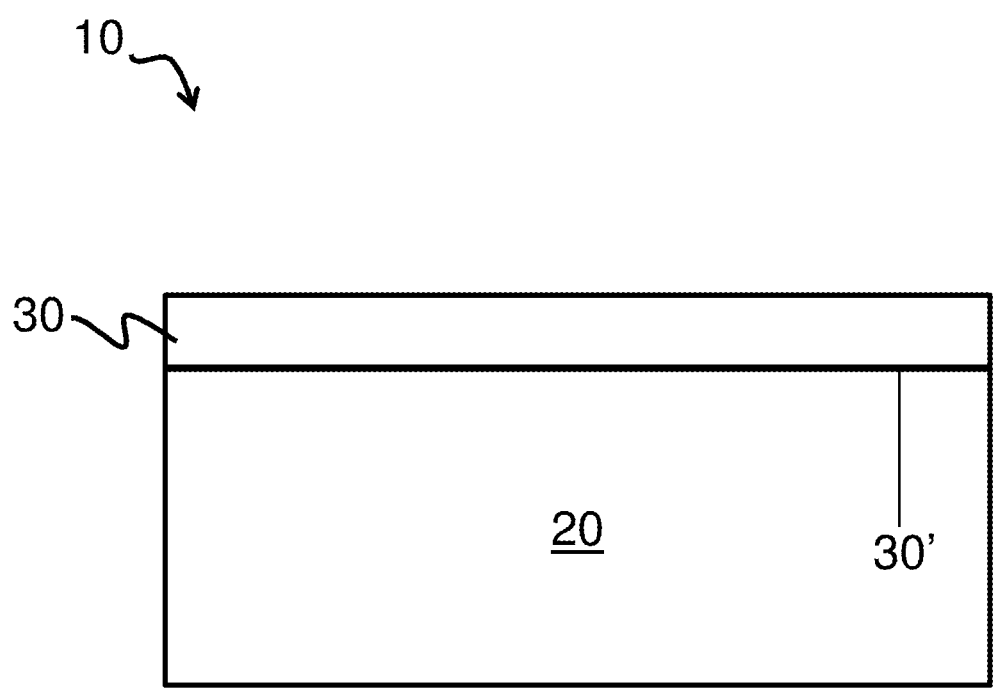
FIG. 1A is a schematic representation of an ion-conductive layer deposited on an underlying layer, according to one set of embodiments.

Articles and methods including layers for protection of electrodes in electrochemical cells are provided. As described herein, a layer, such as a protective layer for an electrode, may comprise a plurality of particles (e.g., crystalline inorganic particles, amorphous inorganic particles). In some embodiments, at least a portion of the plurality of particles (e.g., inorganic particles) are fused to one another. For instance, in some embodiments, the layer may be formed by aerosol deposition or another suitable process that involves subjecting the particles to a relatively high velocity such that fusion of particles occurs during deposition. In some embodiments, the layer (e.g., the layer comprising a plurality of particles) is an ion-conducting layer. In some cases, the layer (e.g., the ion-conducting layer) comprises a relatively low amount of polymer (e.g., less than or equal to about 20 vol % polymer versus total volume fraction of the layer). At least a portion of the plurality of particles may be embedded within another layer (e.g., a substrate, such as an electrode). In certain embodiments, the plurality of particles are formed of a first material (e.g., an inorganic material), and the layer may comprise a second material (e.g., an inorganic material, a polymeric material) different from the first material. When used as a protective layer, the protective layer may be substantially impermeable to a liquid electrolyte.

Advantageously, an ion-conductive layer described herein may maintain the bulk properties of the materials used to form the layer (e.g., crystallinity, ion-conductivity), may exhibit increased flexibility, and/or may permit the incorporation of materials (e.g., ceramics) that would not be generally feasible under traditional vacuum deposition methods.

The disclosed ion-conductive layers may be incorporated into an electrochemical cell. such as a lithium-based electrochemical cell (e.g., a lithium-sulfur electrochemical cell, a lithium-ion electrochemical cell). Although several of the embodiments described herein involve use of such a layer as a protective layer for an electrode, it should be appreciated that the layer may be used as any other appropriate component within an electrochemical cell.

In some embodiments in which the electrochemical cell is a lithium-sulfur electrochemical cell, the incorporation of ion-conductive layers as described herein into electrochemical cells may prevent or reduce the occurrence of chemical reactions between polysulfides (e.g., found in electrolytes comprising polysulfides) and an electroactive material of an anode (e.g., an anode comprising lithium, such as metallic lithium). The use of ion-conductive layers as described herein may offer several advantages over certain traditional protective layers, including increasing utilization of sulfur within an electrochemical cell, reduction or elimination of the shuttle affect, and/or reduction or elimination of electrolyte depletion. Ion-conductive layers and/or composite structures comprising a plurality of particles, as described in more detail herein, may, in some cases, selectively conduct lithium cations. In some embodiments, the ion-conductive layers and/or composite structures comprising a plurality of particles are not conductive towards certain ions, such as polysulfide anions, and/or may function as a barrier (e.g., protective structure) for electrolytes (e.g., liquid electrolytes).

Moreover, ion-conductive layers as described herein may offer additional advantages over certain traditional protective layers including increased flexibility, mechanical stability, chemical stability, and/or ion conductivity, e.g., between a lithium anode and an electrolyte. For example, certain existing protective layers (e.g., including certain ceramic-based ion conductive layers), such as certain protective layers in the form of thin, homogeneous films, may be very thin, brittle, easily cracked during handling or use, porous, and/or contain defects which, as a result, do not have sufficient barrier properties to prevent electrolytes and/or polysulfides from diffusing and/or reacting with an electroactive material of an anode (e.g., an anode comprising lithium). By contrast, an ion-conductive layer comprising a plurality of fused particles may maintain the bulk properties of the materials used to form the layer, exhibit increased flexibility, permit the incorporation of materials (e.g., ceramics) that would not be generally feasible under traditional vacuum deposition methods, and/or decrease manufacturing cost.

In one particular embodiment, flexibility of the ion-conductive layer may be achieved by including a polymer in the ion-conductive layer (e.g., with the plurality of particles). The polymer may be non-ionically conductive, in some cases, such that the layer does not swell in an electrolyte used with the electrochemical cell. In some such embodiments, ionic conduction is maintained across the layer because a continuous pathway (e.g., from a first surface of the ion-conductive layer to a second surface of the ion-conductive layer) is present (e.g., due to fusion of at least a portion of the particles within the layer). In addition, because the particles within the layer may have relatively high ion conductivity, the ion conductivity of the layers described herein may be comparable to those of certain existing protective layers.

The disclosed ion-conductive layers may be incorporated into electrochemical cells, for example, primary batteries or secondary batteries, which can be charged and discharged numerous times. In some embodiments, the materials, systems, and methods described herein can be used in association with lithium batteries (e.g., lithium-sulfur batteries, lithium-ion batteries). The electrochemical cells described herein may be employed in various applications, for example, making or operating cars, computers, personal digital assistants, mobile telephones, watches, camcorders, digital cameras, thermometers, calculators, laptop BIOS, communication equipment or remote car locks. It should be appreciated that while much of the description herein relates to lithium-sulfur and/or lithium-ion batteries, the ion-conductive layers described herein may be applied to other lithium-based batteries, as well as other alkali metal-based batteries.

Turning now to the figures, the various embodiments of the current disclosure are described in more detail below. It should be understood that while certain layers depicted in the figures are disposed directly on one another, other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present.

FIG. 1A depicts one embodiment of an electrode structure 10. The electrode structure includes a first layer 20 (e.g., an electroactive layer) and a second layer 30 (e.g., an ion-conductive layer) deposited on the first layer at first surface 30'. As described herein, second layer 30 may be used as a protective layer to protect the underlying layer (e.g., from reaction with an electrolyte, or species within the electrolyte). Second layer 30 may comprise, in some cases, a plurality of particles. The plurality of particles may be of a single type, or of more than one type, as described in more detail below. In some embodiments, the first layer comprises a first material (e.g., an electroactive material, a material used to form a separator, substrate, or other component) and the second layer comprises a second material different from the first material (e.g., a plurality of particles comprising an inorganic material different than the material used to form the first layer).

Figure 1B:
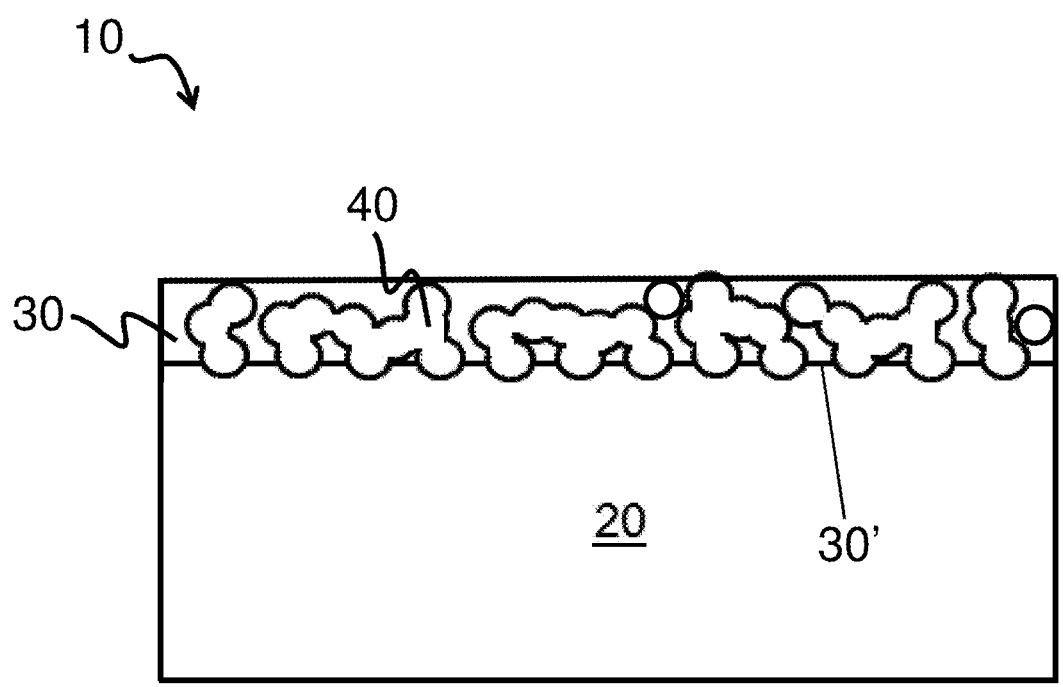
FIG. 1B is another schematic representation of an ion-conductive layer deposited on an underlying layer, according to one set of embodiments.

In some embodiments, the plurality of particles (e.g., inorganic particles) are fused. For example, as illustrated in FIG. 1B, electrode structure 10 comprises first layer 20 (e.g., an electroactive layer or other layer described herein), second layer 30 (e.g., an ion-conductive layer), and a plurality of particles 40. In some such embodiments, at least a portion of the plurality of particles 40 are fused as shown illustratively in the figure. In certain embodiments, the plurality of particles (e.g., fused inorganic particles) are embedded in the first layer. For instance, as described in more detail below, the second layer may be formed at least in part by subjecting the first layer to particles traveling at a certain velocity such that the particles impinge upon the first layer upon contact, and/or fuse with one another upon collision. As shown in this illustrative embodiment, second layer 30 has first surface 30', which may be adjacent the first layer 20. The plurality of particles (e.g., the plurality of fused particles) may, in some cases, contact and/or be embedded in at least a portion of the first layer 20 at first surface 30'.

In some embodiments, the average largest cross-sectional dimension of the particles (e.g., prior to being fused or absent any fusion) may be, for example, less than or equal to 20 microns, less than or equal to about 10 microns, less than or equal to about 5 microns, less or equal to about 2 microns, less than or equal to about 1 micron, or less than or equal to about 0.75 microns. In some embodiments, the average largest cross-sectional dimension of the plurality of particles (e.g., prior to being fused or absent any fusion) may be greater than or equal to about 0.5 microns, greater than or equal to about 0.75 microns, greater than or equal to about 1 micron, greater than or equal to about 1.5 microns, greater than or equal to about 2 microns, greater than or equal to about 3 microns, greater than or equal to about 5 microns, greater than or equal to about 10 microns, or greater than or equal to about 15 microns. Combinations of the above-referenced ranges are also possible (e.g., a largest cross-sectional dimension of less than about 20 microns and greater than about 0.5 microns, a largest cross-sectional dimension of less than about 15 microns and greater than about 1 micron). In some embodiments in which more than one particle type is included in a layer, each particle type may have a value of particle size in one or more of the above-referenced ranges.

In some embodiments, the average largest cross-sectional dimension of the particles (e.g., after being deposited on a surface) may be, for example, less than or equal to about 10 microns, less than or equal to about 5 microns, less or equal to about 2 microns, less than or equal to about 1 micron, less than or equal to about 0.75 microns, less than or equal to about 0.5 microns, less than or equal to about 0.2 microns, less than or equal to about 0.1 microns. In some embodiments, the average largest cross-sectional dimension of the plurality of particles (e.g., after being deposited on a surface) may be greater than or equal to about 0.01 microns, greater than or equal to about 0.1 microns, greater than or equal to about 0.5 microns, greater than or equal to about 0.75 microns, greater than or equal to about 1 micron, greater than or equal to about 1.5 microns, greater than or equal to about 2 microns, greater than or equal to about 3 microns, greater than or equal to about 5 microns. Combinations of the above-referenced ranges are also possible (e.g., a largest cross-sectional dimension of less than about 10 microns and greater than about 0.1 microns, a largest cross-sectional dimension of less than about 5 microns and greater than about 0.01 micron). In some embodiments in which more than one particle type is included in a layer, each particle type may have a value of particle size in one or more of the above-referenced ranges.

As described above, in some embodiments at least a portion of the plurality of particles in a layer may be fused. The terms "fuse" and "fused" (and "fusion") are given their typical meaning in the art and generally refers to the physical joining of two or more objects (e.g., particles) such that they form a single object. For example, in some cases, the volume occupied by a single particle (e.g., the entire volume within the outer surface of the particle) prior to fusion is substantially equal to half the volume occupied by two fused particles. Those skilled in the art would understand that the terms "fuse", "fused", and "fusion" do not refer to particles that simply contact one another at one or more surfaces, but particles wherein at least a portion of the original surface of each individual particle can no longer be discerned from the other particle.

In some cases, the particles are fused such that at least a portion of the plurality of particles form a continuous pathway across the second layer (e.g., between a first surface of the second layer and a second surface of the second layer). A continuous pathway may include, for example, an ionically-conductive pathway from a first surface to a second, opposing surface of the layer in which there are substantially no gaps, breakages, or discontinuities in the pathway. Whereas fused particles across a layer may form a continuous pathway, a pathway including packed, unfused particles would have gaps or discontinuities between the particles that would not render the pathway continuous. In certain embodiments, the layer includes a plurality of such continuous pathways across the layer. In some embodiments, at least 10 vol %, at least 30 vol %, at least 50 vol %, or at least 70 vol % of the second layer comprises one or more continuous pathways comprising fused particles (e.g., which may comprise an ionically conductive material). In certain embodiments, less than or equal to about 100 vol %, less than or equal to about 90 vol %, less than or equal to about 70 vol %, less than or equal to about 50 vol %, less than or equal to about 30 vol %, less than or equal to about 10 vol %, or less than or equal to about 5 vol % of the second layer comprises one or more continuous pathways comprising fused particles. Combinations of the above-referenced ranges are also possible (e.g., at least about 10 vol % and less than or equal to about 100 vol %). In some cases, 100 vol % of the second layer comprises one or more continuous pathways comprising fused particles. That is to say, in some embodiments, the second layer consists essentially of fused particles (e.g., the second layer comprises substantially no unfused particles). In other embodiments, substantially all of the particles are unfused.

Those skilled in the art would be capable of selecting suitable methods for determining if the particles are fused including, for example, performing Confocal Raman Microscopy (CRM). CRM may be used to determine the percentage of fused areas within a layer described herein. For instance, in some embodiments the fused areas may be less crystalline (more amorphous) compared to the unfused areas (e.g., particles) within the layer, and may provide different Raman characteristic spectral bands than those of the unfused areas. In certain embodiments the fused areas may be amorphous and the unfused areas (e.g., particles) within the layer may be crystalline. Crystalline and amorphous areas may have peaks at the same/similar wavelengths, while amorphous peaks may be broader/less intense than those of crystalline areas. In some instances, the unfused areas may include spectral bands substantially similar to the spectral bands of the bulk particles prior to formation of the layer (the bulk spectrum). For example, an unfused area may include peaks at the same or similar wavelengths and having a similar area under the peak (integrated signal) as the peaks within the spectral bands of the particles prior to formation of the layer. An unfused area may have, for instance, an integrated signal (area under the peak) for the largest peak (the peak having the largest integrated signal) in the spectrum that may be, e.g., within at least 70%, at least 75%, at least 80%, at least 85%, at least 90%, at least 95%, or at least 97% of value of the integrated signal for the corresponding largest peak of the bulk spectrum. By contrast, the fused areas may include spectral bands different from (e.g., peaks at the same or similar wavelengths but having a substantially different/lower integrated signal than) the spectral bands of the particles prior to formation of the layer. A fused area may have, for instance, an integrated signal (area under the peak) for the largest peak (the peak having the largest integrated signal) in the spectrum that may be, e.g., less than 50%, less than 60%, less than 70%, less than 75%, less than 80%, less than 85%, less than 90%, less than 95%, or less than 97% of value of the integrated signal for the corresponding largest peak of the bulk spectrum. In some embodiments, 2-dimensional or 3-dimensional mapping of CRM may be used to determine the percentage of fused areas in the layer (e.g., the percentage of area, within a minimum cross-sectional area, having an integrated signal for the largest peak of the spectrum that differs from that for the particles prior to formation of the layer, as described above). The minimum cross-sectional area of the layer used for such an analysis may be, for example, at least 600 $\mu m^2$, at least 900 $\mu m^2$, at least 1000 $\mu m^2$, at least 2000 $\mu m^2$, at least 3000 $\mu m^2$, at least 5000 $\mu m^2$, at least 7000 $\mu m^2$, or at least 10,000 $\mu m^2$, and the intervals of measurement (spatial resolution) within the area may be, for example, 1 $\mu m^2$ or less, 2 $\mu m^2$ or less, 4 $\mu m^2$ or less, 6 $\mu m^2$ or less, or 9 $\mu m^2$ or less. (If a 3-dimensional image is obtained, the minimum volume of the layer used for such an analysis may be, for example, at least 600 $\mu m^3$, at least 900 $\mu m^3$, at least 1000 $\mu m^3$, at least 2000 $\mu m^3$, at least 3000 $\mu m^3$, at least 5000 $\mu m^3$, at least 7000 $\mu m^3$, or at least 10,000 $\mu m^3$, and the intervals of measurement (spatial resolution) within the volume may be, for example, 1 $\mu m^3$ or less, 4 $\mu m^3$ or less, 8 $\mu m^3$ or less, 16 $\mu m^3$ or less, 27 $\mu m^3$ or less, or 64 $\mu m^3$ or less) An average of at least 3, 5, or 7 images may be used to determine percentage of fused area for a particular sample.

In other embodiments, the presence of fused particles may be determined by determining the conductivity of a layer. For instance, a layer comprising fused particles may have an average conductivity greater than an average conductivity of a layer in which the particles are not fused, all other factors being equal. An average of at least 3, 5, or 7 measurements may be used to determine the conductivity for a particular sample.

The plurality of particles may be deposited and/or fused using any suitable method. In some embodiments, a method may involve forming an ion-conductive layer (e.g., a second layer) adjacent to or on a portion of a first layer (e.g., an electroactive material such as an anode comprising lithium, a cathode (e.g., comprising sulfur or other suitable substrate as described herein)). In one set of embodiments, the plurality of particles are deposited and/or fused via an aerosol deposition process. Aerosol deposition processes are known in the art and generally comprise depositing (e.g., spraying) particles (e.g., inorganic particles, polymeric particles) at a relatively high velocity on a surface. For example, in some embodiments, the plurality of particles are deposited on the first layer (e.g., the electroactive material layer) at a relative high velocity such that at least a portion of the plurality of particles fuse (e.g., forming the second layer on the first layer). The velocity required for particle fusion may depend on factors such as the material composition of the particles, the size of the particles, the Young's elastic modulus of the particles, and/or the yield strength of the particles or material forming the particles.

As described herein, in some embodiments, the particles are deposited at a velocity sufficient to cause fusion of at least some of the particles. It should be appreciated, however, that in some embodiments, the particles are deposited at a velocity such that at least some of the particles are not fused. In certain embodiments, the velocity of the particles is at least about 150 m/s, at least about 200 m/s, at least about 300 m/s, at least about 400 m/s, or at least about 500 m/s, at least about 600 m/s, at least about 800 m/s, at least about 1000 m/s, or at least about 1500 m/s. In some embodiments, the velocity is less than or equal to about 2000 m/s, less than or equal to about 1500 m/s, less than or equal to about 1000 m/s, less than or equal to about 800 m/s, 600 m/s, less than or equal to about 500 m/s, less than or equal to about 400 m/s, less than or equal to about 300 m/s, or less than or equal to about 200 m/s. Combinations of the above-referenced ranges are also possible (e.g., between about 150 m/s and about 2000 m/s, between about 150 m/s and about 600 m/s, between about 200 m/s and about 500 m/s, between about 200 m/s and about 400 m/s, between about 500 m/s and about 2000 m/s). Other velocities are also possible. In some embodiments in which more than one particle type is included in a layer, each particle type may be deposited at a velocity in one or more of the above-referenced ranges.

In some embodiments, the deposition method comprises spraying the particles (e.g., via aerosol deposition) on the surface of a first layer by pressurizing a carrier gas with the particles. In some embodiments, the pressure of the carrier gas is at least about 5 psi, at least about 10 psi, at least about 20 psi, at least about 50 psi, at least about 90 psi, at least about 100 psi, at least about 150 psi, at least about 200 psi, at least about 250 psi, or at least about 300 psi. In certain embodiments, the pressure of the carrier gas is less than or equal to about 350 psi, less than or equal to about 300 psi, less than or equal to about 250 psi, less than or equal to about 200 psi, less than or equal to about 150 psi, less than or equal to about 100 psi, less than or equal to about 90 psi, less than or equal to about 50 psi, less than or equal to about 20 psi, or less than or equal to about 10 psi. Combinations of the above-referenced ranges are also possible (e.g., between about 5 psi and about 350 psi). Other ranges are also possible and those skilled in the art would be capable of selecting the pressure of the carrier gas based upon the teachings of this specification. For example, in some embodiments, the pressure of the carrier gas is such that the velocity of the particles deposited on the first layer is sufficient to fuse at least some of the particles to one another.

In some embodiments, the carrier gas (e.g., the carrier gas with the particles) is heated prior to deposition. In some embodiments, the temperature of the carrier gas is at least about 20° C., at least about 25° C., at least about 30° C., at least about 50° C., at least about 75° C., at least about 100° C., at least about 150° C., at least about 200° C., at least about 300° C., or at least about 400° C. In certain embodiments, the temperature of the carrier gas is less than or equal to about 500° C., is less than or equal to about 400° C., is less than or equal to about 300° C., is less than or equal to about 200° C., is less than or equal to about 150° C., is less than or equal to about 100° C., is less than or equal to about 75° C., is less than or equal to about 50° C., is less than or equal to about 30° C. or less than or equal to about 20° C. Combinations of the above-referenced ranges are also possible (e.g., between about 20° C. and about 500° C.). Other ranges are also possible. In certain embodiments, the particles are deposited under a vacuum environment.

For example, in some embodiments, the particles may be deposited on the first layer in a container in which vacuum is applied to the container (e.g., to remove atmospheric resistance to particle flow, to permit high velocity of the particles, and/or to remove contaminants). In certain embodiments, the vacuum pressure within the container is at least about 0.5 mTorr, at least about 1 mTorr, at least about 2 mTorr, at least about 5 mTorr, at least about 10 mTorr, at least about 20 mTorr, or at least about 50 mTorr. In certain embodiments, the vacuum pressure within the container is less than or equal to about 100 mTorr, less than or equal to about 50 mTorr, less than or equal to about 20 mTorr, less than or equal to about 10 mTorr, less than or equal to about 5 mTorr, less than or equal to about 2 mTorr, or less than or equal to about 1 mTorr. Combinations of the above-referenced ranges are also possible (e.g., between about 0.5 mTorr and about 100 mTorr). Other ranges are also possible.

As described herein, in some embodiments a layer (e.g., a second layer such as an ion-conductive layer) is formed by a method involving aerosol deposition of particles. Aerosol deposition, as described herein, generally results in the collision and/or elastic deformation of at least some of the plurality of particles. In some embodiments, aerosol deposition can be carried out under conditions (e.g., using a velocity) sufficient to cause fusion of at least some of the plurality of particles to at least another portion of the plurality of particles.

In some embodiments, a process described herein for forming a second layer can be carried out such that the bulk properties of the precursor materials (e.g., particles) are maintained in the resulting layer (e.g., crystallinity, ion-conductivity). In some cases, the use of aerosol deposition permits the deposition of particles formed of certain materials (e.g., ceramics) not feasible using other deposition techniques (e.g., vacuum deposition). For example, vacuum deposition (e.g., such as sputtering, e-beam evaporation) typically involves relatively high temperatures that would cause some ceramic materials to lose their bulk properties (e.g., crystallinity and/or ion conductivity) upon deposition. In other embodiments, vacuum deposition of certain materials leads to cracking of the resulting layer because such materials may have desirable mechanical properties in the crystalline state which are lost during vacuum deposition (e.g., as amorphous films) resulting in crack formation and/or mechanical stresses formed in the layer (e.g., as a result of strength and/or thermal characteristic mismatch between the substrate and the layer). In certain cases, tempering of the material may not be possible after vacuum deposition for at least the aforementioned reasons. Since aerosol deposition can be carried out at relatively lower temperatures, e.g., compared to certain vacuum deposition techniques, certain materials (e.g., crystalline materials) that are typically incompatible with forming an-ion conductive layer/protective layer can now be used.

Figure 2A:
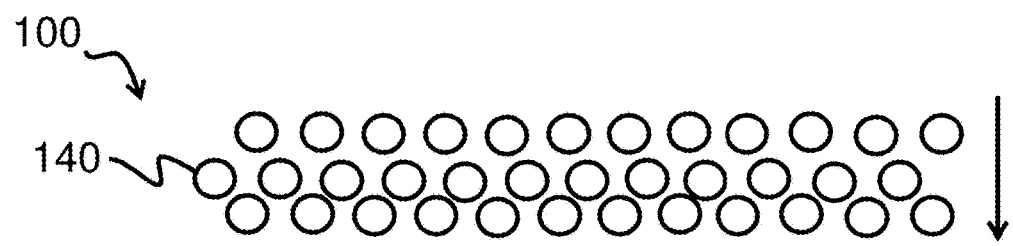
FIGS. 2A-B are a schematic representation of a method for manufacturing an electrode structure, according to one set of embodiments.
Figure 2A:
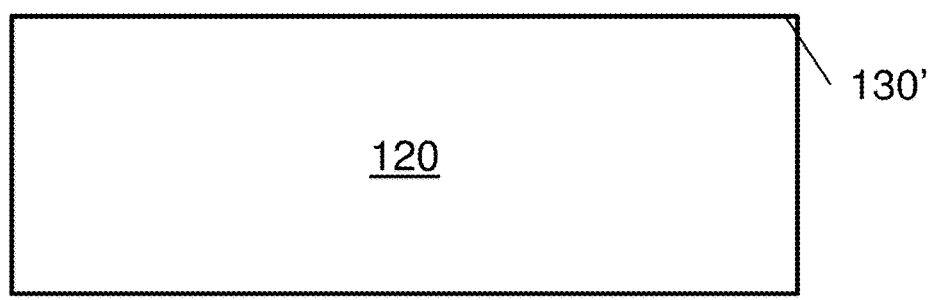
Figure 2B:
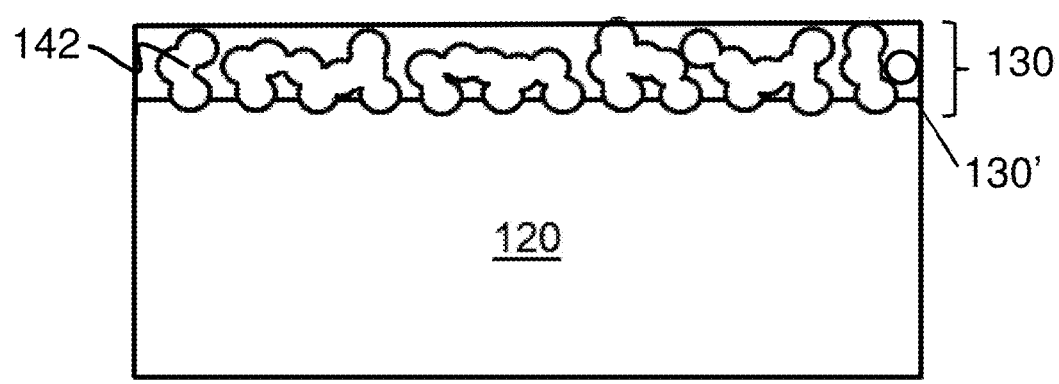

In one exemplary method, and referring to FIG. 2A, forming a second layer (e.g., an ion-conductive layer) may involve providing a first layer 120 (e.g., an electroactive layer or other layer described herein) as a substrate for the formation of the second layer. Particles 140 (e.g., inorganic particles) may be deposited by any suitable method (e.g., aerosol deposition). Referring now to FIG. 2B, particles 140 may be deposited (as indicated by the arrow) on first layer 120. The deposition of the particles may cause the particles to be at least partially embedded within the first layer. In certain embodiments, the particles are deposited at a sufficient velocity such that at least some of the particles come into direct contact with and/or are at least partially embedded within the first layer. In some embodiments, the particles are deposited at a sufficient velocity such that at least some of the plurality of particles are at least partially embedded within the first layer and at least some of the particles are fused (FIG. 2B).

In some embodiments, at least a portion of the plurality of particles of a layer, or at least a portion of the surfaces of the plurality of particles, are in contact (e.g., direct contact) with a first layer (e.g., an electroactive layer or other layer described herein). This configuration can allow transport of ions (e.g., metal ions, such as lithium ions) directly from the particles to the first layer. In some cases, at least a portion of the plurality of particles is embedded within the first layer. For example, in some cases, at least about 0.1 vol % of the particles of a layer (e.g., a second layer) is embedded within the first layer. In some embodiments, at least about 1 vol %, at least about 5 vol %, or at least about 10 vol %, or at least 20 vol % of the particles is embedded within the first layer. In certain embodiments, less than or equal to about 25 vol %, less than or equal to about 20 vol %, less than or equal to about 15 vol %, or less than or equal to about 10 vol % of the particles is embedded within the first layer. Combinations of the above-referenced ranges are also possible (e.g., between about 0.1 vol % and about 25 vol %). Other ranges are also possible. Methods for determining the volume percentage of particles within a layer are known within the art and may include, in some embodiments, dissecting an ion-conductive layer and imaging with, for example, a scanning electron microscope.

Certain conventional electrodes and/or electrochemical cells are made to include an electroactive layer and/or an ion-conductive layer that is as smooth as possible (e.g., prior to cycling), where such smoothness was thought to help increase cycle life (e.g., by reducing pitting or other deterious effects). In one particular set of embodiments described herein, at least a portion of the particles used to form an ion-conductive layer (e.g., a protective layer) are embedded in an electroactive material layer and result in a particular roughness of the electroactive material layer and/or ion-conductive layer. The electroactive material layer and/or ion-conductive layer may have a certain value or range of values of mean peak to valley roughness as described herein (e.g., prior to cycling). In some embodiments, such roughness does not substantially negatively affect cycle life.

Figure 1C:
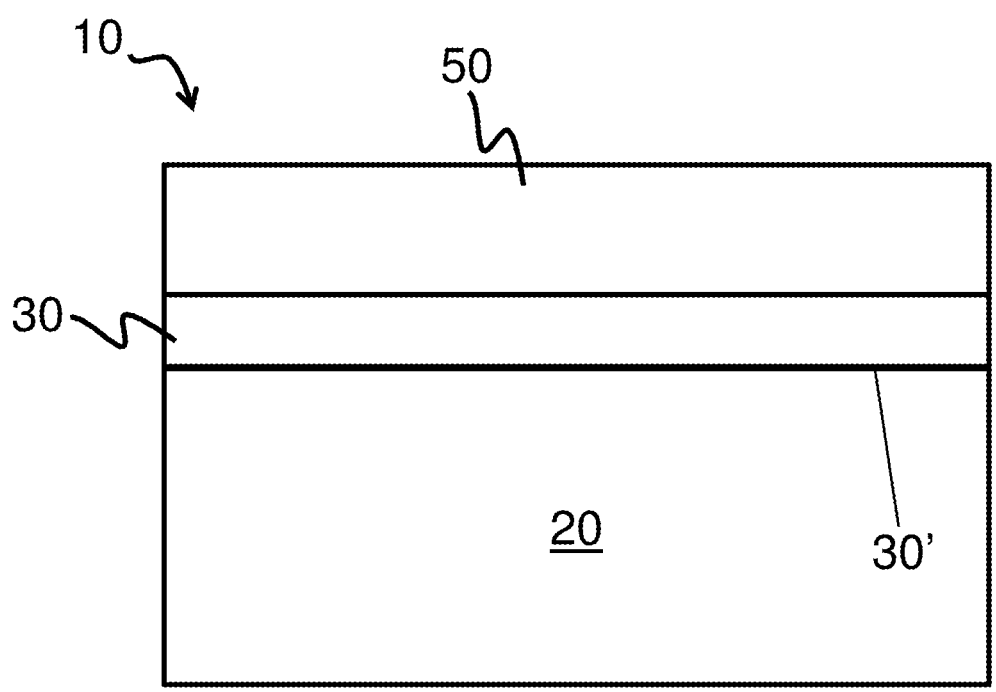
FIG. 1C is a schematic representation of an ion-conductive layer deposited on an underlying layer and an electrolyte layer, according to one set of embodiments.

As described herein, in some embodiments, the second layer is an ion-conductive layer. The ion-conductive layer may include a first surface (e.g., in contact with a first layer, such as an electroactive layer) and a second surface opposing the first surface. In certain embodiments, a surface (e.g., a second surface) of the ion-conductive layer is in contact with an additional layer of an electrode or electrochemical cell (e.g., an optional electrolyte layer 50 in FIG. 1C). In some embodiments, at least some of the particles (e.g., fused particles) comprises a first portion in direct contact with the electroactive layer at the first surface of the ion-conductive layer, and a second portion at the second surface of the ion-conductive layer. For example, the second portion of at least some of the fused particles at the second surface may be in direct contact with an electrolyte material (e.g., an electrolyte layer).

As described above, layers comprising a plurality of particles may serve as a protective layer. In some embodiments, the ion-conductive layer is substantially impermeable to a liquid electrolyte (e.g., a liquid electrolyte to be used in an electrochemical cell including the protective layer). For example, in some embodiments, the ion-conductive layer absorbs less than or equal to about 10 wt %, less than or equal to about 5 wt %, less than or equal to about 1 wt %, less than or equal to about 0.5 wt %, or less than or equal to about 0.1 wt % of a liquid electrolyte versus the total weight of the ion-conductive layer. In certain embodiments, the ion-conductive layer absorbs at least about 0.01 wt %, at least about, 0.1 wt %, at least about 0.5 wt %, at least about 1 wt %, or at least about 5 wt % of a liquid electrolyte versus the total weight of the ion-conductive layer. Combinations of the above-referenced ranges are also possible (e.g., between about 0.01 wt % and about 5 wt %, between about 0.01 wt % and about 0.5 wt %). Those skilled in the art would be capable of selecting suitable methods for determining the liquid electrolyte absorbed by the ion-conductive layer including, for example, measuring the difference in weight of the ion-conductive layer after absorbing the liquid electrolyte (e.g., after exposing the layer to the electrolyte for 1 hour at ambient temperature and pressure) versus the weight of the ion-conductive layer before absorbing the liquid electrolyte.

In some embodiments, the layer comprising a plurality of particles (e.g., fused particles) is substantially non-swellable. For example, the layer (e.g., the ion-conductive layer) may comprise a polymer that is substantially non-swellable in a liquid electrolyte to be used in an electrochemical cell including the protective layer. In some such embodiments, the polymer is substantially non-ionically conductive (e.g., the polymer may have an ion-conductivity of less than about $10^{-8}$ S/cm. Polymers including non-ionically conductive polymers are described in more detail, below.

The particles of an ion-conductive layer and/or the resulting ion-conductive layer described herein can be formed of a variety of types of materials. In certain embodiments, the material from which the particles are formed may be selected to allow ions (e.g., electrochemically active ions, such as lithium ions) to pass through the material but to substantially impede electrons from passing across the material. By "substantially impedes", in this context, it is meant that in this embodiment the material allows lithium ion flux at least ten times greater than electron passage. The particles may comprise, for example, an ion-conductive material (e.g., to facilitate the transfer of ions between materials on either side of the ion-conductive layer). Advantageously, such particles may be capable of conducting specific cations (e.g., lithium cations) while not conducting certain anions (e.g., polysulfide anions) and/or may be capable of acting as a barrier to an electrolyte and/or a polysulfide species for the electroactive layer.

In some embodiments, the particles and/or an ion-conductive layer described herein comprise and/or are formed of an inorganic material. In certain embodiments, the inorganic material comprises a ceramic material (e.g., glasses, glassy-ceramic materials). Non-limiting examples of suitable ceramic materials include oxides (e.g., aluminum oxide, silicon oxide, lithium oxide), nitrides, and/or oxynitrides of aluminum, silicon, zinc, tin, vanadium, zirconium, magnesium, indium, and alloys thereof, $Li_xMP_yS_z$ (where x, y, and z are integers, e.g., integers less than 20; and where M=Sn, Ge, or Si) such as $LiMP_2S_{12}$ (e.g., where M=Sn, Ge, Si) and LiSiPS, garnets, crystalline or glass sulfides, phosphates, perovskites, anti-perovskites, other ion conductive inorganic materials and mixtures thereof. $Li_xMP_yS_z$ particles can be formed, for example, using raw components $Li_2S$, $SiS_2$ and $P_2S_5$ (or alternatively $Li_2S$, Si, S and $P_2S_5$), for example.

In some embodiments, the particles of an ion-conductive layer, and/or an ion-conductive layer itself, may comprise a material including one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, oxy-sulfides (e.g., lithium oxy-sulfides) and combinations thereof. In some embodiments, the plurality of particles may comprise $Al_2O_3$, $ZrO_2$, $SiO_2$, $CeO_2$, and/or $Al_2TiO_5$. In a particular embodiment, the plurality of particles may comprise Li—Al—Ti—$PO_4$ (LATP). The selection of the material (e.g., ceramic) will be dependent on a number of factors including, but not limited to, the properties of electrolyte and the anode and cathode used in the cell.

In some embodiments, the particles of an ion-conductive layer, and/or an ion-conductive layer itself, may comprise a polymeric material (e.g., a non-ionically conductive polymeric material and/or an ion-conductive polymeric material). Polymeric materials suitable for use in an ion-conductive layer (or as particles for forming an ion-conductive layer) are described in more detail below.

In some embodiments, the particles of an ion-conductive layer, and/or an ion-conductive layer itself, are/is substantially amorphous. In certain embodiments, the particles and/or an ion-conductive layer described herein are/is substantially crystalline. In some cases, the particles and/or an ion-conductive layer described herein may be semi-crystalline. For example, in some embodiments, the particles and/or an ion-conductive layer described herein may be at least about 1% crystalline, at least about 2% crystalline, at least about 5% crystalline, at least about 10% crystalline, at least about 25% crystalline, at least about 50% crystalline, at least about 75% crystalline, at least about 80% crystalline, at least about 90% crystalline, at least about 95% crystalline, at least about 98% crystalline, at least about 99% crystalline. In certain embodiments, the particles and/or an ion-conductive layer described herein may be 100% crystalline. In some embodiments, the particles and/or an ion-conductive layer described herein may be less than or equal to about 99.9% crystalline, less than or equal to about 99.5% crystalline, less than or equal to about 99% crystalline, less than or equal to about 98% crystalline, less than or equal to about 95% crystalline, less than or equal to about 90% crystalline, less than or equal to about 80% crystalline, less than or equal to about 75% crystalline, less than or equal to about 50% crystalline, less than or equal to about 25% crystalline, less than or equal to about 10% crystalline, less than or equal to about 5% crystalline, or less than or equal to about 2% crystalline. Combinations of the above referenced ranges are also possible (e.g., between about 1% crystalline and 100% crystalline, between about 1% crystalline and about 99.9% crystalline). Those skilled in the art would be capable of selecting suitable methods for determining percent crystallinity including, for example, x-ray diffraction spectra of the particles and/or ion-conductive layer.

The plurality of particles may include more than one type of particles. For example, a first portion of the plurality of particles may comprise a first type of inorganic material and a second portion of the plurality of particles may comprising a second type of inorganic material. In another example, a first portion of the plurality of particles may comprise an inorganic material and a second portion of the plurality of particles may comprise a polymeric material. In yet another example, a first portion of the plurality of particles may comprise a first type of polymeric material and a second portion of the plurality of particles may comprise a second type of polymeric material. In some embodiments, the plurality of particles comprise more than one, more than two, or more than three types of particles (e.g., inorganic, polymeric, or combinations thereof). For instance, a layer may include at least 2, at least 3, at least 4 types of particles, wherein each of the particle types are different.

In some embodiments, the particles of an ion-conductive layer may be selected to have a desirable ion conductivity. For example, in certain embodiments, the particles may be conductive to ions of the electroactive material (e.g. lithium). In some cases, the particles may have an average ion conductivity (e.g., lithium ion conductivity) of at least about $10^{-6}$ S/cm. In certain embodiments, the average ion conductivity (e.g., metal ion, such as lithium ion conductivity) of the particles within the ion-conductive layer is at least about $10^{-6}$ S/cm, at least about $10^{-5}$ S/cm, at least about $10^{-4}$ S/cm, at least about, or at least about $10^{-3}$ S/cm. In some embodiments, the average ion conductivity of the particles is less than about $10^{-2}$ S/cm, less than about $10^{-3}$ S/cm, or less than about $10^{-4}$ S/cm. Combinations of the above-reference ranges are also possible (e.g., an ion conductivity between about $10^{-2}$ S/cm and about $10^{-6}$ S/cm, between about $10^{-3}$ S/cm and about $10^{-5}$ S/cm). Other ion conductivity is are also possible. Conductivity may be measured at room temperature (e.g., 25 degrees Celsius).

In some embodiments, the average ion conductivity of the particles can be determined before the particles are incorporated into the ion-conductive layer. The average ionic conductivity can be measured by pressing the particles between two copper cylinders at a pressure of up to 3 tons/cm$^2$. In certain embodiments, the average ion conductivity (i.e., the inverse of the average resistivity) can be measured at 500 kg/cm$^2$ increments using a conductivity bridge (i.e., an impedance measuring circuit) operating at 1 kHz. In some such embodiments, the pressure is increased until changes in average ion conductivity are no longer observed in the sample.

In certain embodiments, the particles may have an electronic conductivity of less than about $10^{-10}$ S/cm. For example, in some embodiments, the electronic conductivity of the particles is less than or equal to about $10^{-11}$ S/cm, less than or equal to about $10^{-12}$ S/cm, less than or equal to about $10^{-13}$ S/cm, less than or equal to about $10^{-14}$ S/cm, less than or equal to about $10^{-15}$ S/cm, less than or equal to about $10^{-17}$ S/cm, or less than or equal to about $10^{-19}$ S/cm. Other values and ranges of electronic conductivity are also possible.

In certain embodiments, the particles (e.g., fused particles) of the ion-conductive layer are substantially non-porous. For instance, in some embodiments, the particles do not have any substantial "dead space" where undesirable species such as air can be trapped within the particles, since trapping of such species can reduce the ion conductivity of the particles. In some cases, an average porosity of the particles may be less than about 10 vol %, less than about 5 vol %, less than about 2 vol %, less than about 1 vol %, or less than about 0.1 vol %. In some embodiments, the average porosity of the particles may be between about 0.01 vol % and about 0.1 vol %, or between about 0.1 vol % and about 2 vol %.

Average porosity can be measured, for example, using a mercury porosimeter. Briefly, average porosity can be determined by measuring the external pressure required to force a liquid (e.g., mercury) into a pore (e.g., against the opposing force of surface tension between the liquid and the pore). Those skilled in the art would be capable of selecting an appropriate range of external pressures based upon the particles selected.

It may be advantageous for the particles to comprise a material that is chemically stable when in contact with one or more layers of the electrochemical cell. Generally, particles are chemically stable if the material forming the particles does not react chemically (e.g., form a byproduct) with a component of one or more materials that may come in direct contact with the particles. For example, in certain embodiments, the particles are chemically stable when in contact with the electroactive material, when in contact with the polymeric material, when in contact with an electrolyte material, and/or when in contact with a polysulfide.

In some embodiments, the weight percentage of the particles (e.g., fused particles) in the ion-conductive layer is between about 80 wt % and about 99.9 wt %. That is to say, in some embodiments, the ion-conductive layer includes between about 80 wt % and about 99.9 wt % of an ionically conductive material. In certain embodiments, the ion-conductive layer comprises particles (or ionically conductive material) in an amount greater than or equal to about 80 wt %, greater than or equal to about 85 wt %, greater than or equal to about 90 wt %, greater than or equal to about 95 wt %, greater than or equal to about 97 wt %, greater than or equal to about 98 wt %, or greater than or equal to about 99 wt % of the total composition of the ion-conductive layer. In some embodiments, the weight percentage of the particles (or ionically conductive material) in the ion-conductive layer is less than about 99.9 wt %, less than or equal to about 99.5 wt %, less than about 99 wt %, less than about 98 wt %, less than about 97 wt %, less than about 95 wt %, less than about 90 wt %, or less than about 85 wt % of the total composition of the ion-conductive layer. Combinations of the above-reference ranges are also possible (e.g., between about 80 wt % and about 99.9 wt %, between about 80 wt % and about 95 wt %, between about 80 wt % and about 90 wt %). Other ranges are also possible. Methods for determining the weight percentage of particles within a layer are known within the art and may include, in some embodiments, weighing the particles and the polymer before the formation of the ion-conductive layer.

As described herein, aerosol deposition of particles may be used to form an ion-conductive layer on a substrate as described herein. In certain embodiments, the difference between the hardness of the particles and the hardness of the substrate on which the particles are deposited may be less than or equal to 200%, less than or equal to 100%, less than or equal to 80%, less than or equal to 60%, less than or equal to 40%, less than or equal to 20%, less than or equal to 10%, or less than or equal to 5%. In some embodiments, the difference in hardness may be at least 0.01%, at least 0.1%, at least 1%, at least 5%, at least 10%, or at least 50%. Combinations of the above-referenced ranges are also possible. The difference may be calculated by subtracting the smaller value of hardness from the larger value of hardness, dividing by the larger value of hardness, and multiplying by 100. Those skilled in the art would be capable of selecting suitable methods for determining hardness of the materials described herein, including, for example, nanoindentation.

In some embodiments, the ion-conductive layer comprises an additional material. For example, in some cases, the ion-conductive layer comprises a non-ionically conductive material. In certain embodiments, the ion-conductive layer comprises an additional conductive material (e.g., an ionically conductive material). The additional material may be in particulate form or non-particulate form.

In some embodiments, the additional material is an inorganic material. Inorganic materials are described above, in regards to the plurality of particles, and may be suitable for use as an additional material.

In some embodiments, an ion-conductive layer may include a polymeric material. The polymeric material may be present in the ion-conductive layer in the spaces between the particles (e.g., fused particles) forming the layer. For instance, the layer may include a composite of particles (e.g., fused particles) and regions of polymeric material.

In some embodiments, the polymeric material is deposited (e.g., aerosol deposited) on a first layer. In certain embodiments, particles (e.g., polymer particles) comprising the polymeric material is deposited on the first layer. The polymer material may be deposited substantially simultaneously with deposition of the inorganic material (e.g., the particles and the polymeric material may be mixed prior to deposition, or may be introduced from different sources onto the same substrate).

In other embodiments, the polymeric material may be deposited on the first layer prior to deposition of the particles of inorganic material. For instance, after forming a first layer comprising a polymeric material (which may be deposited by aerosol deposition, or by any other suitable method for forming a polymeric layer, such as a coating method) the inorganic particles may be deposited on and/or into the polymeric material. In certain embodiments, the inorganic particles may be deposited after and onto/into the polymer material such that at least a portion of the inorganic particles fuse.

In some embodiments involving depositing inorganic (e.g., ceramic) particles onto a polymeric layer, a gradient in the density of the inorganic material/particles across the thickness of the layer may be formed. For instance, in one method, a polymeric layer is positioned on a first layer (e.g., a substrate). The polymeric material may be in any suitable form (e.g., a gel, a solid). Then, inorganic particles may be deposited onto the polymeric layer (e.g., by aerosol deposition). The resulting structure may be a composite of the inorganic particles and the polymeric material, with the density of inorganic material increasing across at least a portion (or substantially all of) the thickness of the resulting structure from the first layer to the outer surface of the structure. Such a structure may be formed, in some embodiments, by increasing the velocity of the inorganic particles gradually throughout deposition. In some instances, the deposition occurs such that at least a portion of the inorganic particles fuse. For instance, the particles/inorganic material at the outer surface of the resulting structure may be substantially fused, while the particles/inorganic material adjacent the first surface may remain substantially unfused, partially fused, or fused to a lesser extent compared to that at the outer surface. In other embodiments, the reverse gradient can be formed.

Methods and conditions (e.g., velocity, pressures, etc.) for depositing materials are described in detail herein.

Any suitable polymeric material can be included in an ion-conductive layer. In some embodiments, the polymeric material may include or consist essentially of one or more polymeric materials. The polymeric material may, in some embodiments, be a monomer, a mixture of copolymers, block copolymers, or a combination of two or more polymers that are in an interpenetrating network or semi-interpenetrating network. In alternative embodiments, the polymeric material may comprise a filler and/or solid additive. The filler and/or solid additive may add strength, flexibility, and/or improved adhesion properties to the polymer. In some embodiments, the polymer may comprise a plasticizer or other additives, including solid phase change materials. Addition of plasticizers may increase flexibility of the polymer and improve thixotropic properties. Addition of solid phase change materials may result in addition of materials that melt at elevated temperatures and thereby act as a heat sink and prevent thermal runaway.

In some embodiments, the polymeric material may be selected to be flexible. Nano-hardness studies may be conducted to measure creep and/or hardness and thereby assess the flexibility and/or brittleness of a polymeric material. In certain cases, the polymeric material may be selected to be thermally stable above 100° C., 150° C., 200° C., 250° C., 300° C., 350° C., or 400° C. Thermal stability may be assessed by differential scanning calorimetry (DSC). Non-limiting examples of polymeric materials that may exhibit thermal stability at elevated temperatures include polysiloxanes, polycyanurates, and polyisocyanurates.

The polymeric material may, in certain cases, be selected to be substantially inert to the electrolyte solution and/or to Li polysulfide attack. A means of determining the stability of a polymeric material in an electrolyte solution includes exposing a small sample of the polymeric material to vapors of an electrolyte solvent, or to the electrolyte solvent itself. Examples of polymeric materials that may be stable in an electrolyte solution include, but are not limited to, polyurethanes and polysiloxanes. Additional tests that may be conducted on polymeric materials to examine various characteristics include Fourier transform infrared spectroscopy (FTIR) to confirm that a polymeric material is cured or cross-linked, scanning electron microscopy with energy dispersive x-ray spectroscopy (SEM-EDS) to determine whether a polymeric material has cracks. Such test and other tests can also be used to determine whether an ion-conductive layer comprises discrete layers, interpenetrating networks, or semi-interpenetrating networks. Profilometry can be used to assess how rough the surface of a polymeric material is.

Other classes of polymeric materials that may be suitable for use in an ion-conductive layer (e.g., as particles to be fused during formation of the ion-conductive layer) include, but are not limited to, polyamines (e.g., poly(ethylene imine) and polypropylene imine (PPI)); polyamides (e.g., polyamide (Nylon), poly($\epsilon$-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamides, poly(acrylates), poly(methacrylates), poly(2-vinyl pyridine), poly(N-vinylpyrrolidone), poly(methylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polyethylene, polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymeric material may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Accordingly, those of ordinary skill in the art can choose suitable polymeric materials based on their mechanical and/or electronic properties (e.g., ionic and/or electronic conductivity), and/or can modify such polymeric materials to be ionically conducting (e.g., conductive towards single ions) and/or electronically non-conducting based on knowledge in the art, in combination with the description herein. As described herein, in some embodiments the polymeric material is substantially non-ionically conductive. However, in other embodiments in which it is desirable for the polymeric material to be ionically conductive (e.g., particles comprising such ionically conductive polymeric materials), the polymeric materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB (Ph)$_4$, LiPF$_6$, LiC(SO$_2$CF$_3$)$_3$, and LiN(SO$_2$CF$_3$)$_2$), to enhance ionic conductivity. Salts may be added to the material in a range of, e.g., 0 to 50 mol %. In certain embodiments, salts are included in at least 5 mol %, at least 10 mol %, at least 20 mol %, at least 30 mol %, at least 40 mol %, or at least 50 mol % of the material. In certain embodiments, additional salts are less than or equal to 50 mol %, less than or equal to 40 mol %, less than or equal to 30 mol %, less than or equal to 20 mol %, or less than or equal to 10 mol % of the material. Combinations of the above-noted ranges are also possible. Other values of mol % are also possible.

In certain embodiments, the average ionic conductivity of the polymeric material may be less than or equal to about $10^{-3}$ S/cm, less than or equal to about $10^4$ S/cm, less than or equal to about $10^{-5}$ S/cm, less than or equal to about $10^{-6}$ S/cm, or less than or equal to about $10^{-7}$ S/cm. In some embodiments, the average ionic conductivity of the polymeric material of an ion-conductive layer is at least about $10^{-8}$ S/cm, at least about $10^{-7}$ S/cm, at least about $10^{-6}$ S/cm, at least about $10^{-5}$ S/cm, at least about $10^4$ S/cm, or at least about $10^{-3}$ S/cm. Combinations of the above-referenced ranges are also possible (e.g., an average ionic conductivity in the electrolyte of at least about $10^{-8}$ S/cm and less than or equal to about $10^{-6}$ S/cm). Conductivity may be measured at room temperature (e.g., 25 degrees Celsius).

In some embodiments, the polymeric material may be substantially non-ionically conductive and substantially non-electrically conductive. For example, non-electrically conductive materials (e.g., electrically insulating materials) such as those described herein can be used. In other embodiments, the polymeric material may be ionically conductive but substantially non-electrically conductive. Examples of such polymeric materials include non-electrically conductive materials (e.g., electrically insulating materials) that are doped with lithium salts, such as acrylate, polyethylene oxide, silicones, and polyvinyl chlorides.

In some embodiments, the polymeric material included in a composite is substantially non-swellable in an electrolyte solvent to be used in an electrochemical cell including such an ion-conductive layer. For instance, the polymeric material may experience a volume change of less than 10%, less than 8%, less than 6%, less than 5%, less than 4%, less than 2%, or less than 1% when in contact with an electrolyte solvent (including any salts or additives present) to be used in an electrochemical cell including such an ion-conductive layer for at least 24 hours. In some embodiments, the polymeric material (e.g., the gel comprising the polymeric material) may increase in volume (i.e. swell) in the presence of the liquid electrolyte by at least about 0.01 vol %, at least about 0.1 vol %, at least about 0.2 vol %, at least about 0.5 vol %, at least about 1 vol %, or at least about 2 vol %. Combinations of the above referenced ranges are also possible (e.g., between about 0.01 vol % and about 5 vol %). Simple screening tests of such polymers can be conducted by placing pieces of polymer in the electrolyte solvent (including any salts or additives present) and measuring the weight or volume change of the polymer pieces before and after a 24 hour period, and determining the percentage change in volume relative to the volume before placement in the solvent.

It may be advantageous, in some embodiments, for the polymeric material to comprise or be formed of a material that is chemically stable when in contact with one or more layers of the electrochemical cell (e.g., an electrolyte layer). The polymeric material may be chemically stable if, for example, the material does not react chemically (e.g., form a byproduct) with a component of one or more additional layers of the electrochemical cell in direct contact with the polymeric material. For example, in certain embodiments, the polymeric material is chemically stable when in contact with the electroactive material, when in contact with an electrolyte material, and/or when in contact with a polysulfide. In certain embodiments, the polymeric material may form a reaction product with the components of the electrode for electrochemical cell (e.g., an electroactive material, an electrolyte material (e.g., a species within the electrolyte), and/or a polysulfide); however, in such embodiments, the reaction product does not interfere with the function of a layer including the polymeric material (e.g., the layer remains ionically conductive).

In certain embodiments, the polymeric material may be substantially non-cross-linked. However, in other embodiments, the polymeric material is cross-linked. In some such embodiments, the polymeric material may be cross-linked with a portion of the plurality of particles. For example, in some embodiments, a portion of the plurality of particles may be coated with a cross-linking polymer (e.g., bound to the surface of a portion of the plurality of particles). Cross-linking can be achieved by, for example, adding cross-linker to a polymer and performing a cross-linking reaction, e.g., by thermal or photochemical curing, e.g. by irradiation with such as UV/vis irradiation, by γ-irradiation, electron beams (e-beams) or by heating (thermal cross-linking). Examples of cross-linkers may include ones selected from molecules with two or more carbon-carbon double bonds, e.g., ones with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, cyclopentadiene dimer, 1,3-divinyl benzene, and 1,4-divinyl benzene. Some suitable cross-linkers may comprise two or more epoxy groups in the molecule, such as, for example, bis-phenol F, bis-phenol A, 1,4-butanediol diglycidyl ether, glycerol propoxylate triglycidyl ether, and the like.

In some embodiments, the polymeric material may be in the form of a gel. In some embodiments, the polymeric material forms a polymer gel when exposed to a liquid electrolyte. In certain embodiments, the polymeric material may swell in the presence of a liquid electrolyte. For example, in some embodiments, the polymeric material (e.g., the gel comprising the polymeric material) may increase in volume (i.e. swell) in the presence of the liquid electrolyte by at least about 20 vol %, at least about 30 vol %, at least about 40 vol %, at least about 50 vol %, at least about 60 vol %, at least about 70 vol %, at least about 80 vol %, or at least about 90 vol %. In certain embodiments, the polymeric material may increase in volume (i.e. swell) in the presence of a liquid electrolyte by less than or equal to about 200 vol %, less than or equal to about 100 vol %, less than or equal to about 80 vol %, less than or equal to about 60 vol %, less than or equal to about 40 vol %, or less than or equal to about 20 vol %. Combinations of the above referenced ranges are also possible (e.g., between about 50 vol % and about 100 vol %). Simple screening tests of such polymer gels can be conducted by placing pieces of polymer gel in the electrolyte solvent (including any salts or additives present) and measuring the weight or volume change of the gel pieces before and after a 24 hour period, and determining the percentage change in volume relative to the volume before placement in the solvent.

In some embodiments, the additional material (e.g., the polymeric material) is present in the ion-conductive layer in an amount of at least about 5 wt %, at least about 10 wt %, at least about 20 wt %, or at least about 25 wt %. In certain embodiments, the additional material is present in the ion-conductive layer is less than or equal to about 30 wt %, less than or equal to about 25 wt %, less than or equal to about 20 wt %, less than or equal to about 15 wt %, or less than or equal to about 10 wt %. Combinations of the above referenced ranges are also possible (e.g., between about 5 wt % and about 30 wt %). Other ranges are also possible. In some cases, the ion-conductive layer comprises substantially no additional material.

As described above, in some embodiments, flexibility of the ion-conductive layer may be achieved by including a polymer in the ion-conductive layer.

In some cases, flexibility may be characterized by, for example, determining the critical radius of curvature (e.g., by a bending test and scanning electron microscopy and/or profilometry measurements conducted at a particular bend radius), nano-hardness tests, and/or AFM indentation (e.g., nanoindentation).

In some embodiments, the ion-conductive layer may have a particular critical radius of curvature. For example, a first ion-conductive layer comprising a plurality of particles and an additional material may have an overall thickness, a total amount of particles (e.g., fused particles), and a total amount of additional material. A second, comparative ion-conductive layer (e.g., comprising the plurality of particles) may have the same or similar overall thickness, the same/similar total amount of inorganic material, but substantially no additional material, or the same/similar total amount of additional material, but the additional material comprising an inorganic material. The first ion-conductive layer may have a critical radius of curvature larger than the critical radius of curvature of the second ion-conductive layer, e.g., by at least a factor of about 2, at least a factor of about 10, at least a factor of about 20, at least a factor of about 50, or at least a factor of about 100, in some embodiments up to a factor of 1000, or up to a factor of 500. A critical radius of curvature for the first ion-conductive layer that is larger than the critical radius of curvature for the second ion-conductive layer may indicate that the first composite is more flexible than the second composite. The critical radius of curvature may be determined for each ion-conductive layer according to any method known in the art. For example, the critical radius of curvature may be determined using a bending test. Such a test may involve obtaining a sample (e.g. a sample having dimensions of 5 cm×2.5 cm). The geometric center of the sample is determined by optical profilometry. The edges of the sample are moved together, causing the sample to be bent into the shape of an arc. For example, for a sample having a length of 5 cm, the edges of the sample may be moved to distances ranging from about 4.5 cm (e.g., a slight change, or relatively small radius of curvature) to about 2.5 cm (e.g., a severe change, or relatively large radius of curvature). At different distances, the radius of curvature of the sample may be measured, and the presence or absence of fractures may be determined by optical profilometry at the geometric center. The critical radius of curvature is the minimum radius of curvature at which fracture begins to take place at the geometric center of the sample. In some embodiments, the plurality of particles comprise an ionically conductive material having a particular Young's elastic modulus. In some embodiments, the Young's elastic modulus of the plurality of particles is at least about 0.1 GPa, at least about 0.5 GPa, at least about 1 GPa, at least about 2 GPa, at least about 5 GPa, at least about 10 GPa, at least about 20 GPa, at least about 50 GPa, at least about 100 GPa, at least about 200 GPa, or at least about 400 GPa. In certain embodiments, the Young's elastic modulus of the plurality of particles is less than or equal to about 500 GPa, less than or equal to about 400 GPa, less than or equal to about 200 GPa, less than or equal to about 100 GPa, less than or equal to about 50 GPa, less than or equal to about 20 GPa, less than or equal to about 10 GPa, less than or equal to about 5 GPa, less than or equal to about 2 GPa, less than or equal to about 1 GPa, or less than or equal to about 0.5 GPa. Combinations of the above-referenced ranges are also possible (e.g., between about 0.1 GPa and about 500 GPa). In a particular embodiment, the Young' elastic modulus of the particles is at least about 1 Gpa. In certain embodiments, the Young's elastic modulus of the fused particles is substantially the same as the Young's elastic modulus as the particles prior to fusion. The Young's elastic modulus may be measured by nano-indentation (AFM).

In certain embodiments, the additional or second material (e.g., the polymeric material such as a non-ionically conductive material) has a Young's elastic modulus that is at least about 2 times, at least about 5 times, at least about 10 times, at least about 20 times, at least about 50 times, or at least about 100 times less than the Young's elastic modulus of the particles (e.g., fused particles) used to form and/or present in the ion-conductive layer. The additional or second material (e.g., the polymeric material such as a non-ionically conductive material) may have a Young's elastic modulus that is less than or equal to about 100 times, less than or equal to about 50 times, less than or equal to about 10 times the Young's elastic modulus of the particles (e.g., fused particles) used to form and/or present in the ion-conductive layer. Combinations of the above-referenced ranges are also possible. Those skilled in the art would be capable of selecting suitable methods for determining Young's elastic modulus of the materials described herein.

In certain embodiments, the additional or second material (e.g., the polymeric material such as a non-ionically conductive material) has a yield strength that is at least about 2, at least about 5, at least about 10, or at least about 100 times less than the yield strength of the particles (e.g., fused particles, and/or inorganic particles) used to form and/or present in the ion-conductive layer. The additional or second material (e.g., the polymeric material such as a non-ionically conductive material) may have a yield strength that is less than or equal to about 100 times, less than or equal to about 50 times, less than or equal to about 10 times the yield strength of the particles (e.g., fused particles) used to form and/or present in the ion-conductive layer. Combinations of the above-referenced ranges are also possible. Those skilled in the art would be capable of selecting suitable methods for determining yield strength of the materials described herein, including, for example, nanoindentation.

In some embodiments, the weight ratio of ionically conductive material (e.g., comprising the plurality of particles) and non-ionically conductive material (e.g., comprising a polymeric material) present in an ion-conductive layer is between about 80:20 and about 95:5, although other ranges are also possible. In some embodiments, the weight ratio of ionically conductive material and non-ionically conductive material is at least about 70:30, at least about 80:20, at least about 85:15, or at least about 90:10. In some embodiments, the weight ratio of ionically conductive material and non-ionically conductive material is less than or equal to about 95:5, less than or equal to about 90:10, or less than or equal to about 85:15. Combinations of the above-referenced ranges are also possible (e.g., between about 80:20 and about 95:5).

An ion-conductive layer comprising a plurality of particles (e.g., fused particles) may have any suitable thickness. In some embodiments, an ion-conductive layer described herein may have an average thickness of at least about 0.5 microns, at least about 1 micron, at least about 3 microns, at least about 5 microns, at least about 10 microns, at least about 15 microns, or at least about 20 microns. In some embodiments, the average thickness of the ion-conductive layer is less than or equal to about 25 microns, less than or equal to about 20 microns, less than or equal to about 10 microns, less than or equal to about 5 microns or less than or equal to about 3 microns. Other ranges are also possible. Combinations of the above-noted ranges are also possible (e.g., between about 3 microns and about 25 microns, between about 5 microns and about 10 microns). The average thickness of the ion-conductive layer can be determined, for example, using a drop gauge or scanning electron microscopy (SEM), as described above.

In some embodiments, the ion-conductive layer may be substantially non-porous (e.g., have a low porosity). For instance, in some cases, the plurality of particles are deposited on the first layer (optionally with an additional/second material) and form an ion-conductive layer that is substantially non-porous. In some embodiments, less than or equal to about 99.9%, less than or equal to about 99.5%, less than or equal to about 99%, less than or equal to about 98%, or less than or equal to about 97% of the ion-conductive layer is non-porous. In certain embodiments, at least about 95%, at least about 97%, at least about 98%, at least about 99%, or at least about 99.5% of the ion-conductive layer is non-porous. In certain embodiments, the ion-conductive layer has a particular porosity. For example, the porosity of the ion-conductive layer may be less than or equal to about 5%, less than or equal to about 3%, less than or equal to about 2%, or less than or equal to about 1%. Porosity/non-porosity can be determined, for example, by mercury porosimetry (e.g., Brunauer-Emmett-Teller porosity).

The ion-conductive layer may have any suitable density. In certain embodiments, the density of the ion-conductive layer is between about 1.5 g/cm$^3$ and about 6 g/cm$^3$. For example, in some embodiments, the ion-conductive layer has a density of at least about 1.5 g/cm$^3$, at least about 2 g/cm$^3$, at least about 2.5 g/cm$^3$, at least about 3 g/cm$^3$, at least about 4 g/cm$^3$, or at least about 5 g/cm$^3$. In certain embodiments, the ion-conductive layer has a density of less than or equal to about 6 g/cm$^3$, less than or equal to about 5 g/cm$^3$, less than or equal to about 4 g/cm$^3$, less than or equal to about 3 g/cm$^3$, less than or equal to about 2.5 g/cm$^3$, or less than or equal to about 2 g/cm$^3$. Combinations of the above-referenced ranges are also possible (e.g., between about 1.5 g/cm$^3$ and about 6 g/cm$^3$). Other ranges are also possible.

In certain embodiments, the ion-conductive layer has an overall ionic conductivity (e.g., lithium ion conductivity) of at least about at least about $10^{-7}$ S/cm, at least about $10^{-6}$ S/cm, at least about $10^{-5}$ S/cm, at least about $10^{-4}$ S/cm, or at least about $10^{-3}$ S/cm. In certain embodiments, the average ionic conductivity of the ion-conductive layer (e.g., lithium ion conductivity) may be less than or equal to about less than or equal to about $10^{-2}$ S/cm, less than or equal to about $10^{-3}$ S/cm, less than or equal to about $10^{-4}$ S/cm, less than or equal to about $10^{-5}$ S/cm, or less than or equal to about $10^{-6}$ S/cm. Combinations of the above-referenced ranges are also possible (e.g., an average ionic conductivity of at least about $10^{-7}$ S/cm and less than or equal to about $10^{-2}$ S/cm, an average ionic conductivity of at least about $10^{-6}$ S/cm and less than or equal to about $10^{-2}$ S/cm, an average ionic conductivity of at least about $10^{-5}$ S/cm and less than or equal to about $10^{-3}$ S/cm). Conductivity (e.g., dry conductivity) may be measured at room temperature (e.g., 25 degrees Celsius), for example, using a conductivity bridge (i.e., an impedance measuring circuit) operating at 1 kHz in the absence of an electrolyte and/or solvent (i.e., for a dry ion-conductive layer).

In some embodiments, the percent difference in ionic conductivity between the particles (e.g., prior to deposition or fusing) and the resulting layer (e.g., comprising the particles), may be less than about 1000%, less than about 700%, less than about 500%, less than about 200%, less than about 100%, less than about 50%, less than about 40%, less than about 30%, less than about 20%, less than about 10%, less than about 5%, less than about 3%, less than about 1%, or less than about 0.5%. In some cases, the percent difference in ionic conductivity between the particles (e.g., prior to deposition or fusing) and the resulting layer (e.g., comprising the particles), may be greater than or equal to about 0.1%, greater than or equal to about 0.5%, greater than or equal to about 1%, greater than or equal to about 3%, greater than or equal to about 5%, greater than or equal to about 10%, greater than or equal to about 20%, greater than or equal to about 50%, greater than or equal to about 100%, greater than or equal to about 200%, greater than or equal to about 500%, greater than or equal to about 700%, or greater than or equal to about 1000%. Combinations of the above-referenced ranges are also possible (e.g., between about 0.1% and about 10%). In some embodiments, there is substantially no difference in ionic conductivity between the particles and the resulting layer. The percent different may be calculated by subtracting the lower value of ionic conductivity from the higher value of ionic conductivity, and dividing by the higher value of ionic conductivity.

In some embodiments, the ion-conductive layer (e.g., comprising a polymer and a plurality of particles), as described herein, may have a mean peak to valley roughness ($R_z$) of less than or equal to about 2 μm, less than or equal to about 1.5 μm, less than or equal to about 1 μm, less than or equal to about 0.9 μm, less than or equal to about 0.8 μm, less than or equal to about 0.7 μm, less than or equal to about 0.6 μm, less than or equal to about 0.5 μm, or any other appropriate roughness. In some embodiments, the ion-conductive layer has an $R_z$ of greater than or equal to about 50 nm, greater than or equal to about 0.1 μm, greater than or equal to about 0.2 μm, greater than or equal to about 0.4 μm, greater than or equal to about 0.6 μm, greater than or equal to about 0.8 μm, greater than or equal to about 1 μm, or any other appropriate roughness. Combinations of the above-noted ranges are possible (e.g., an $R_z$ of greater than or equal to about 0.1 μm and less than or equal to about 1 μm). Other ranges are also possible.

The mean peak to valley roughness (Rz) may be calculated, for example, by imaging the surface with a non-contact 3D optical microscope (e.g., an optical profiler). Briefly, an image may be acquired at a magnification between about 5× and about 110× (e.g., an area of between about 50 microns×50 microns and about 1.2 mm×1.2 mm) depending on the overall surface roughness. Those skilled in the art would be capable of selecting an appropriate magnification for imaging the sample. The mean peak to valley roughness can be determined by taking an average of the height difference between the highest peaks and the lowest valleys for a given sample size (e.g., averaging the height difference between the five highest peaks and the five lowest valleys across the imaged area of the sample) at several different locations on the sample (e.g., images acquired at five different areas on the sample).

In some embodiments, the first layer on which the ion-conductive layer (e.g., an electroactive layer), may have a mean peak to valley roughness in one or more of the above-referenced ranges for the ion-conductive layer. In some cases, the roughness may be caused at least in part by particles being embedded in the first layer.

As described herein, it may be desirable to determine if an ion-conductive layer (e.g., comprising a plurality of fused particles) has advantageous properties as compared to other materials used as a protective layer (e.g., a protective layer formed of a polymeric material alone, a protective layer formed of an ion-conductive material alone, or combinations thereof) for particular electrochemical systems. Therefore, simple screening tests can be employed to help select between candidate materials. One simple screening test includes positioning an ion-conductive layer (e.g., comprising a plurality of fused particles) in an electrochemical cell, e.g., as a protective layer in a cell. The electrochemical cell may then undergo multiple discharge/charge cycles, and the electrochemical cell may be observed for whether inhibitory or other destructive behavior occurs compared to that in a control system. If inhibitory or other destructive behavior is observed during cycling of the cell, as compared to the control system, it may be indicative of a degradation mechanisms of the ion-conductive layer, within the assembled electrochemical cell. Using the same electrochemical cell it is also possible to evaluate the electrical conductivity and ion conductivity of the ion-conductive layer using methods known to one of ordinary skill in the art. The measured values may be compared to select between candidate materials and may be used for comparison with baseline material(s) in the control.

In some embodiments, it may be desirable to test the ion-conductive layer for swelling in the presence of a particular electrolyte or solvent to be used in an electrochemical cell (including any salts or additives present). A simple screening test may involve, for example, pieces of the ion-conductive layer that are weighed and then placed in a solvent or an electrolyte to be used in an electrochemical cell for any suitable amount of time (e.g., 24 hours). The percent difference in weight (or volume) of the ion-conductive layer before and after the addition of a solvent or an electrolyte may determine the amount of swelling of the ion-conductive layer in the presence of the electrolyte or the solvent.

Another simple screen test involves determining the stability (i.e., integrity) of an ion-conductive layer to polysulfides (e.g., for use in a lithium-sulfur electrochemical cells) and/or an electrolyte (e.g., for use in lithium-ion electrochemical cells). Briefly, the ion-conductive layer may be exposed to a polysulfide solution/mixture or liquid electrolyte for any suitable amount of time (e.g., 72 hours) and the percent weight loss of the ion-conductive layer after exposure to the polysulfide solution or liquid electrolyte may be determined by calculating the difference in weight of the ion-conductive layer before and after the exposure. For example, in some embodiments, the percent weight loss of the ion-conductive layer after exposure to the polysulfide solution or liquid electrolyte may be less than or equal to about 15 wt %, less than or equal to about 10 wt %, less than or equal to about 5 wt %, less than or equal to about 2 wt %, less than or equal to about 1 wt %, or less than or equal to about 0.5 wt %. In certain embodiments, the percent weight loss of the ion-conductive layer after exposure to the polysulfide solution or liquid electrolyte may be greater than about 0.1 wt %, greater than about 0.5 wt %, greater than about 1 wt %, greater than about 2 wt %, greater than about 5 wt %, or greater than about 10 wt %. Combinations of the above-referenced ranges are also possible (e.g., between about 0.1 wt % and about 5 wt %). In some cases, x-ray diffraction may be used to determine stability of an ion-conductive layer to polysulfides or liquid electrolytes.

The above described screening tests may also be adapted and used to determine the properties of individual components of the ion-conductive layer (e.g. polymeric material/polymer layer and/or a plurality of particles).

While many embodiments described herein relate to lithium-sulfur and/or lithium-ion electrochemical cells, it is to be understood that any analogous alkali metal/sulfur electrochemical cells (including alkali metal anodes) can be used. As noted above and as described in more detail herein, in some embodiments, the ion-conductive layer is incorporated into an electrochemical cell as a protective layer for an electrode. In some embodiments, the ion-conductive layers disclosed herein may include in an electrochemical cell comprising at least one electrode structure. In some cases, the electrochemical cell may be fabricated by providing an electrode structure, one or more the ion-conductive layers, and an electrolyte layer. The electrode structures may include an electroactive layer (e.g., an anode or a cathode) and one or more ion-conductive layers. The ion-conductive layers may be highly conductive to electroactive material ions and may protect the underlying electroactive material surface from reaction with components in the electrolyte, as described above. In some embodiments, the ion-conductive layer may be adjacent the anode. In some embodiments, the ion-conductive layer may be adjacent the cathode. In certain embodiments, the ion-conductive layer may be adjacent a separator.

An electrochemical cell or an article for use in an electrochemical cell may include an electroactive material layer. In some embodiments, a first layer described herein (e.g., a layer on which an ion-conductive layer is formed) comprises an electroactive material (e.g., the first layer is an electroactive layer). In some cases, the first layer may be an anode (e.g., an anode of an electrochemical cell).

Suitable electroactive materials for use as anode active materials in the electrochemical cells described herein include, but are not limited to, lithium metal such as lithium foil and lithium deposited onto a conductive substrate, and lithium alloys (e.g., lithium-aluminum alloys and lithium-tin alloys). Lithium can be contained as one film or as several films, optionally separated by a protective material such as a ceramic material or an ion conductive material described herein. Suitable ceramic materials include silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicium (silicon), indium, and/or tin. While these materials may be preferred in some embodiments, other cell chemistries are also contemplated. In some embodiments, the anode may comprise one or more binder materials (e.g., polymers, etc.).

One or more electroactive layers (e.g., comprising an electroactive material), as described herein, may have a mean peak to valley roughness ($R_z$) of less than or equal to about 10 µm, less than or equal to about 2 µm, less than or equal to about 1.5 µm, less than or equal to about 1 µm, less than or equal to about 0.9 µm, less than or equal to about 0.8 µm, less than or equal to about 0.7 µm, less than or equal to about 0.6 µm, less than or equal to about 0.5 µm, or any other appropriate roughness. In some embodiments, the one or more electroactive layers (e.g., comprising an electroactive material) has an $R_z$ of greater than or equal to about 50 nm, greater than or equal to about 0.1 µm, greater than or equal to about 0.2 µm, greater than or equal to about 0.4 µm, greater than or equal to about 0.6 µm, greater than or equal to about 0.8 µm, greater than or equal to about 1 µm, greater than or equal to about 2 µm, greater than or equal to about 5 µm, or any other appropriate roughness. Combinations of the above-noted ranges are possible (e.g., an $R_z$ of greater than or equal to about 0.1 µm and less than or equal to about 1 µm). Other ranges are also possible. In some embodiments, the mean peak to valley roughness of one or more electroactive layers is determined prior to charge/discharge of the electrochemical cell. The mean peak to valley roughness ($R_z$) of the one or more electroactive layers may be determined, for example, by imaging the surface with a non-contact 3D optical microscope (e.g., an optical profiler), as described above.

In some such embodiments, a first layer described herein (e.g., a layer on which an ion-conductive layer is formed) may be a cathode (e.g., a cathode of an electrochemical cell). Suitable electroactive materials for use as cathode active materials in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In certain embodiments, the cathode may include as an electroactive species elemental sulfur, sulfides, and/or polysulfides. In other embodiments, an intercalation electrode (e.g., a lithium-intercalation cathode) may be used. Non-limiting examples of suitable materials that may intercalate ions of an electroactive material (e.g., alkaline metal ions) include oxides, titanium sulfide, and iron sulfide. Additional examples include $Li_xCoO_2$, $Li_xNiO_2$, $Li_xMnO_2$, $Li_xMn_2O_4$, $Li_xFePO_4$, $Li_xCoPO_4$, $Li_xMnPO_4$, and $Li_xNiPO_4$, where $(0<x\leq1)$, and $LiNi_xMn_yCo_zO_2$ where $(x+y+z=1)$.

In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials (e.g., lithium-sulfur electrochemical cells). "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain embodiments, the sulfur-containing material (e.g., in an oxidized form) comprises a polysulfide moiety, $S_m$, selected from the group consisting of covalent $S_m$ moieties, ionic $S_m$ moieties, and ionic $S_{m2}$— moieties, wherein m is an integer equal to or greater than 3. In some embodiments, m of the polysulfide moiety $S_m$ of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety $S_m$ is covalently bonded by one or both of its terminal sulfur atoms as a side group to the polymer backbone chain. In certain embodiments, the sulfur-containing polymer has a polymer backbone chain and the polysulfide moiety $S_m$ is incorporated into the polymer backbone chain by covalent bonding of the terminal sulfur atoms of the polysulfide moiety.

In some embodiments, the electroactive sulfur-containing material comprises more than 50% by weight of sulfur. In certain embodiments, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some embodiments, the electroactive sulfur-containing material comprises elemental sulfur. In certain embodiments, the electroactive sulfur-containing material comprises a mixture of elemental sulfur and a sulfur-containing polymer.

In certain embodiments, an electrochemical cell as described herein, comprises one or more cathodes comprising sulfur as a cathode active species. In some such embodiments, the cathode includes elemental sulfur as a cathode active species.

In some embodiments, a first layer described herein (e.g., a layer on which an ion-conductive layer is formed) is a separator. For instance, in some embodiments, the plurality of particles are deposited on a separator (e.g., via aerosol deposition). Such separators generally comprise a polymeric material (e.g., polymeric material that does or does not swell upon exposure to electrolyte). In some embodiments, the separator is located between the ion-conductive layer and an electrode (e.g., an anode, a cathode).

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25 degrees Celsius).

In some embodiments, the separator can be ionically conductive, while in other embodiments, the separator is substantially ionically non-conductive. In some embodiments, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm).

In some embodiments, the separator can be a solid. The separator may be porous to allow an electrolyte solvent to pass through it. In some cases, the separator does not substantially include a solvent (like in a gel), except for solvent that may pass through or reside in the pores of the separator. In other embodiments, a separator may be in the form of a gel.

A separator as described herein can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate)

(PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity, if desired.

Those of ordinary skill in the art, given the present disclosure, would be capable of selecting appropriate materials for use as the separator. Relevant factors that might be considered when making such selections include the ionic conductivity of the separator material; the ability to deposit or otherwise form the separator material on or with other materials in the electrochemical cell; the flexibility of the separator material; the porosity of the separator material (e.g., overall porosity, average pore size, pore size distribution, and/or tortuosity); the compatibility of the separator material with the fabrication process used to form the electrochemical cell; the compatibility of the separator material with the electrolyte of the electrochemical cell; and/or the ability to adhere the separator material to the ion conductor material. In certain embodiments, the separator material can be selected based on its ability to survive the aerosol deposition processes without mechanically failing. For example, in embodiments in which relatively high velocities are used to deposited the plurality of particles (e.g., inorganic particles), the separator material can be selected or configured to withstand such deposition.

The first layer (e.g., the separator) may be porous. In some embodiments, the separator pore size may be, for example, less than 5 microns. In certain embodiments, the separator pore size may be between 50 nm and 5 microns, between 50 nm and 500 nm, between 100 nm and 300 nm, between 300 nm and 1 micron, between 500 nm and 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm). In certain embodiments, the separator may be substantially non-porous.

As described herein, in certain embodiments, the electrochemical cell comprises an electrolyte. The electrolytes used in electrochemical or battery cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity) as described herein. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may range, in some cases, from about 5 wt %:95 wt % to 95 wt %:5 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, the non-aqueous electrolyte comprises at least one lithium salt. For example, in some cases, the at least one lithium salt is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(C_nF_{2n+1}SO_2)_3$, wherein n is an integer in the range of from 1 to 20, and $(C_nF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, the first layer described herein (e.g., a layer on which an ion-conductive layer is formed) comprises a material that can dissolve in an electrolyte to be used with the electrochemical cell, or in any other suitable solvent (e.g., a non-electrolyte solvent). Accordingly, at least a portion, or all, of the first layer may be removed from the ion-conductive layer. Removal of at least a portion, or all, of the first layer may take place prior to the ion-conductive layer being placed in an electrochemical cell, or after the ion-conductive layer being placed in an electrochemical cell. In some cases, removal can take place during cycling of the electrochemical cell. Non-limiting examples of materials that can dissolve in an electrolyte or any other suitable solvent include, for example, polysulphone, polyethylene oxide, kynar, and polystyrene. For example, in some embodiments, at least about 10 vol %, at least about 20 vol %, at least about 30 vol %, at least about 50 vol %, at least about 70 vol %, or at least about 90 vol % of the first layer may be removed from the ion-conductive layer. In certain embodiments, less than or equal to about 100 vol %, less than or equal to about 90 vol %, less than or equal to about 70 vol %, less than or equal to about 50 vol %, less than or equal to about 30 vol %, or less than or equal to about 20 vol % of the first layer may be removed from the ion-conductive layer. Combinations of the above-referenced ranges are also possible (e.g., between about 10 vol % and about 100 vol %). In some cases, substantially all (e.g., 100%) of the first layer may be removed from the ion-conductive layer.

In some embodiments, an electrode structure described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In certain embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer may not be needed.

The following examples are intended to illustrate certain embodiments of the present invention, but do not exemplify the full scope of the invention.

EXAMPLES

Example 1

This example illustrates the formation of an ion-conductive layer by depositing and fusing a plurality of particles by aerosol deposition on a substrate.

Figures 3A, 3B:
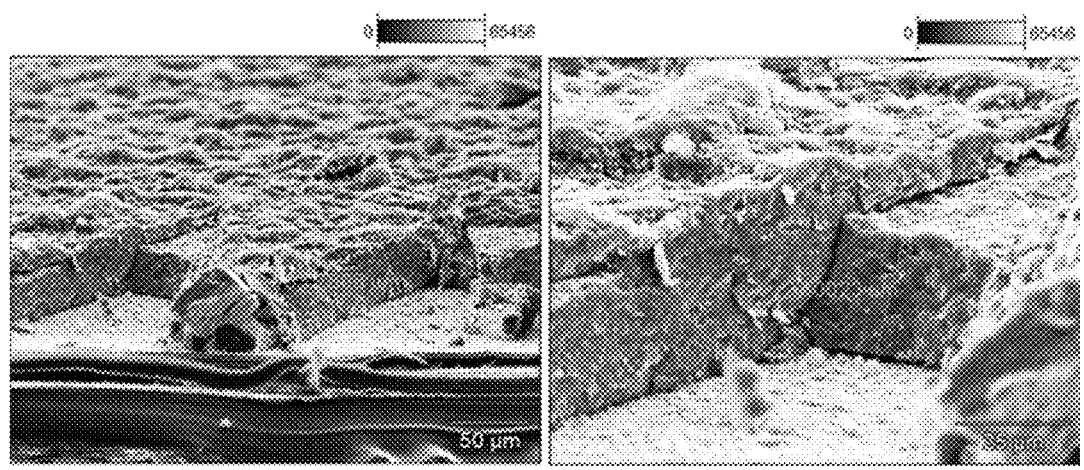
FIG. 3A shows a cross-sectional view SEM image of an ion-conductive layer, according to one set of embodiments.
FIG. 3B shows another cross-sectional view SEM image of the ion-conductive layer in FIG. 3A, according to one set of embodiments.

Anionically-conductive solid particles of LiSiPS were prepared with a particle distribution with an average of about 10 microns. Particles were prepared by mixing $Li_2S$, $SiS_2$ and $P_2S_5$ and heating the components to about 700° C. After cooling, the material was ground and partially wet milled (e.g., in dry hexane/a water-free non-reactive organic solvent such as a dried alkane) in order to achieve the desired particle size distribution. Sieving was also conducted, in some cases, to remove larger particles (e.g., particles having a diameter of greater than >25 micrometer) from the distribution. The particles were loaded into an aerosol deposition method (ADM) powder feed system, and using a carrier gas pressure of 90 PSI, the particles were sprayed onto a 4 micron-thick PET substrate in a rough vacuum environment (0.5 mTorr). Via a motion control system both the substrate holder and the aerosol nozzle may be moved to yield the desired ceramic coverage on the substrate. SEM images of the final coating are shown in FIGS. 3A-3B. As can be seen from the images, the resulting coating was dense and about 27 microns to about 34 microns in thickness. A portion of the coating (above the 27 μm cross-section in FIG. 3B) was broken off during handling, and as such, the thickness of the measured portion of the coating is less than that shown in FIG. 3A.

Figure 3C:
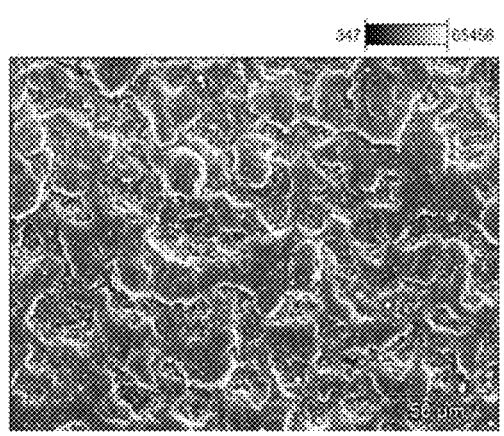
FIGS. 3C-3D show top-down SEM views of the ion-conductive layer in FIGS. 3A-3B, according to one set of embodiments.
Figure 3D:
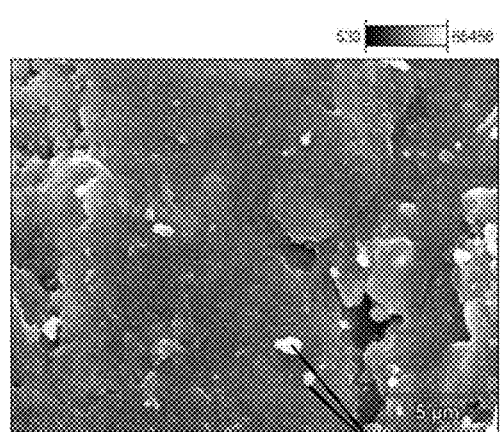

FIGS. 3C-3D are top-down views of the LiSPS material deposited on the PET substrate. Fused areas can be seen in the magnified view in FIG. 3D, including smaller particles on the surface.

Example 2

This example illustrates the formation of another ion-conductive layer by depositing and fusing a plurality of particles by aerosol deposition on a substrate.

Figure 4A:
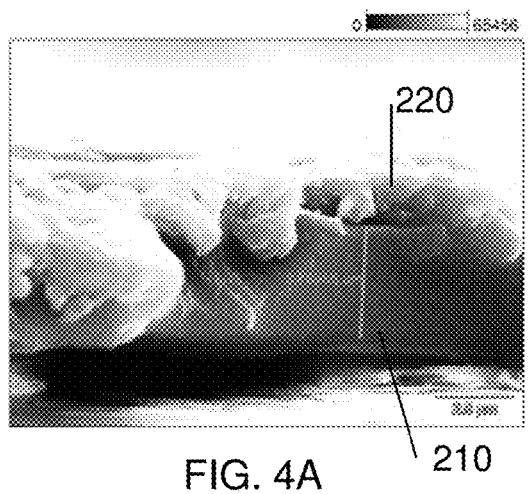
FIGS. 4A-4C show cross-sectional view SEM images of another ion-conductive layer, according to one set of embodiments.
Figure 4B:
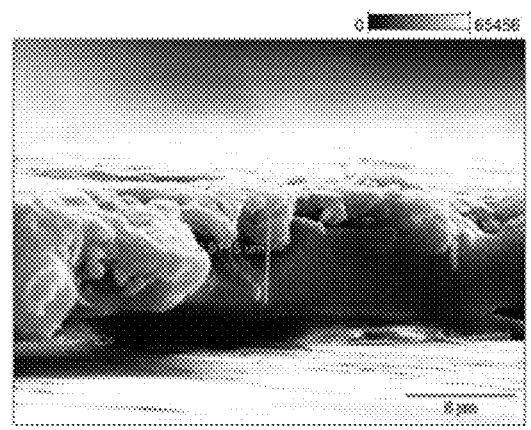

SEM cross-section images of Garnet particles deposited on a 4 micron thickness PET substrate via aerosol deposition are shown in FIGS. 4A-4B. The deposition process as described in Example 1 was followed except a carrier gas pressure of 100 PSI and a pressure of 1 Torr was used. FIG. 4A shows a fused, crystalline portion 210 having a thickness of approximately 3.8 μm. A top portion 220 included some fused particles, but this portion was less fused that portion 210. The entire thickness of the layer was 4.9 μm (FIG. 4B).

Comparative Example 2

This comparative example illustrates the formation of the ion-conductive layer in Example 2 with partial fusion of the plurality of particles.

Figure 4C:
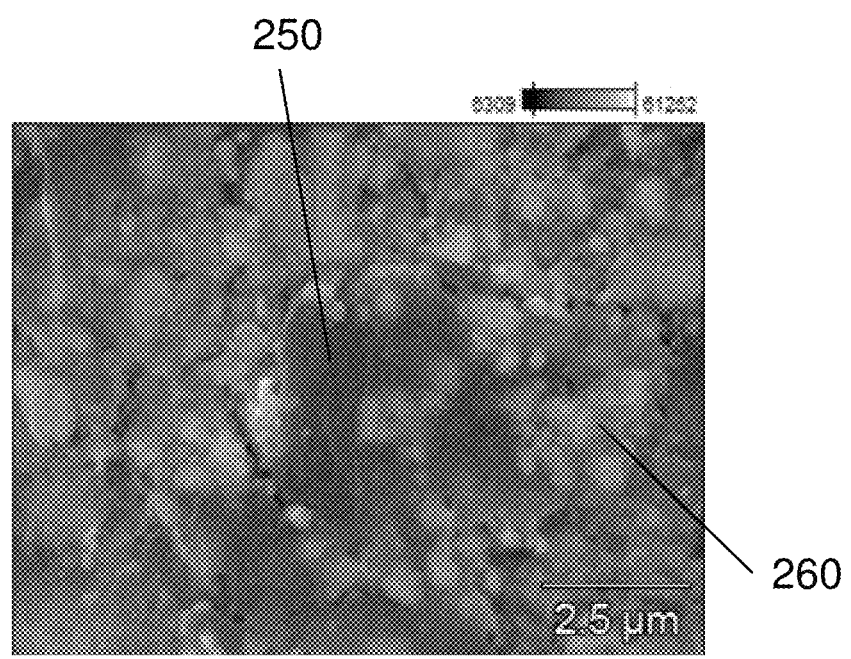

An SEM cross-section image of Garnet particles deposited on a 4 micron thickness PET substrate via aerosol deposition, as described in Example 2, is shown in FIG. 4C. FIG. 4C shows a fused, crystalline portion 250 and a partially fused portion 260. The deposition process as described in Example 1 was followed except a carrier gas pressure of 80 PSI and a pressure of 1 Torr was used.

Example 3

This example illustrates the formation of yet another ion-conductive layer by depositing and fusing a plurality of particles by aerosol deposition on a substrate.

Figure 5A:
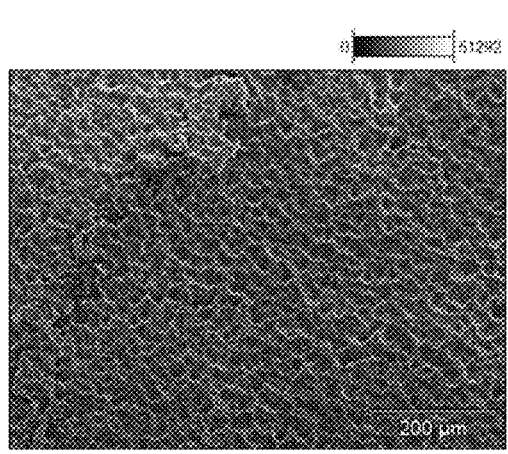
FIGS. 5A-5C show top-down SEM views of yet another ion-conductive layer, according to one set of embodiments.
Figure 5B:
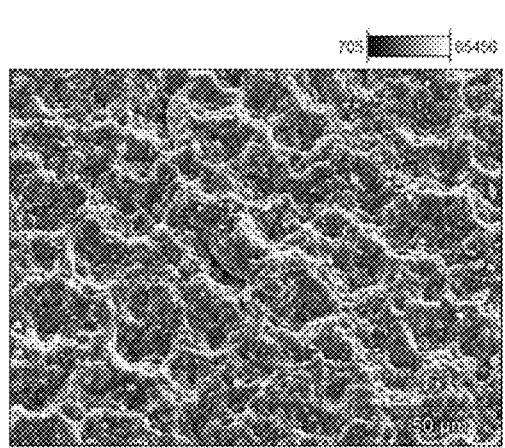
Figure 5C:
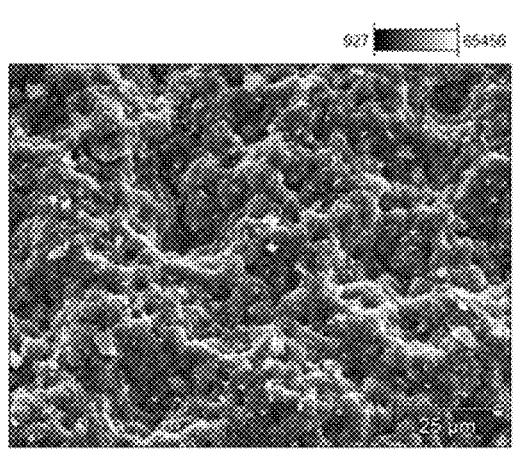

Top-down views of an oxy-sulfide ceramic particles deposited via aerosol deposition on a 25 micron thickness coating of lithium on copper foil are shown in FIGS. 5A-5C. The deposition process as described in Example 1 was followed except a carrier gas pressure of 30 PSI and a pressure of 1 Torr was used. Although the ceramic coating seems to have adopted a surface roughness similar, or larger, than that of the original lithium surface, the coating itself is continuous across the thickness of the layer.

Figure 5D:
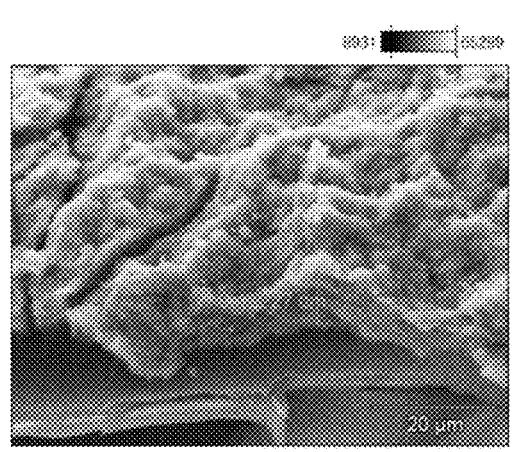
FIG. 5D shows a cross-sectional view SEM image of the ion-conductive layer in FIGS. 5A-5C, according to one set of embodiments.

FIG. 5D is an SEM cross-section image of the ion-conductive layer comprising fused oxy-sulfide ceramic particles deposited via aerosol deposition on the 25 micron thickness coating of lithium on copper foil.

Comparative Example 3

This comparative example illustrates the formation of the ion-conductive layer in Example 3 with poor fusion of the plurality of particles.

Oxy-sulfide ceramic particles were deposited via aerosol deposition on a 25 micron thickness coating of lithium on copper foil. The deposition process as described in Example 1 was followed except a carrier gas pressure of 15 PSI and a pressure of 1 Torr was used. However, the oxy-sulfide ceramic particles were deposited such that the particles did not fuse or fused partially (poor fusion). FIGS. 6A-6B are SEM cross-section images of an ion-conductive layer comprising at least a portion of unfused particles 310 and partially fused oxy-sulfide ceramic particle region 320.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of forming an article for use in an electrochemical cell, the method comprising:
   exposing a first layer comprising a first material to a plurality of particles having a velocity of at least 200 m/s, wherein the particles comprise a second material different from the first material;
   embedding at least a portion of the particles in the first layer; and
   forming a second layer comprising the plurality of particles, wherein at least a portion of the plurality of particles are fused to one another,
   wherein the exposing step is performed at a pressure of greater than or equal to 0.5 mTorr and less than or equal to 100 mTorr,
   wherein at least a first portion of the plurality of particles comprise an ionically-conductive material and at least a second portion of the plurality of particles comprise a non-ionically conductive material, and
   wherein the second layer has an ionic conductivity between about $10^{-6}$ S/cm and about $10^{-2}$ S/cm.

2. A method of forming an article for use in an electrochemical cell, the method comprising:
   exposing a first layer comprising a first material to a plurality of particles having a velocity sufficient to cause fusion of at least some of the particles, wherein the particles comprise a second material;
   embedding at least a portion of the particles in the first layer; and
   forming a second layer comprising the second material, wherein the exposing step is performed at a pressure of greater than or equal to 0.5 mTorr and less than or equal to 100 mTorr,
   wherein the second layer has an ionic conductivity between about $10^{-6}$ S/cm and about $10^{-2}$ S/cm.

3. A The method of claim 2, comprising fusing at least a portion of the plurality of particles when forming the second layer.

4. The method of claim 2, comprising forming a continuous, ionically conductive pathway from the plurality of particles.

5. The method of claim 2, wherein exposing the first layer to the plurality of particles comprises spraying the plurality of particles onto the first layer using aerosol deposition.

6. The method of claim 2, wherein the exposing step is performed at a temperature of less than 500° C.

7. A The method of claim 2, comprising exposing the first layer to the plurality of particles having a velocity of at least 500 m/s, and up to 2000 m/s.

8. The method of claim 2, wherein at least 10 vol % of the second layer comprises one or more continuous pathways.

9. The method of claim 2, wherein the second layer has an ionic conductivity between about 10-5 S/cm and about 10-3 S/cm.

10. The method of claim 2, wherein the second layer has an average thickness between about 3 microns and about 25 microns.

11. The method of claim 2, wherein the plurality of particles have an average largest cross-sectional dimension of between about 0.5 microns and about 20 microns.

12. The method of claim 2 wherein at least 50% of the plurality of particles are fused to one another in the second layer.

13. The method of claim 2, wherein the second layer comprises an ionically-conductive material and a non-conically conductive material.

14. The method of claim 2, wherein the second layer comprises an ionically-conductive material and a non-ionically conductive material; and wherein a weight ratio of the ionically conductive material to the non-ionically conductive material is at least 80:20.

15. The method of claim 2, wherein the ionically-conductive material comprises an inorganic material.

16. The method of claim 2, wherein the ionically-conductive material comprises a ceramic, wherein the ceramic is a garnet.

17. The method of claim 2, wherein the ionically conductive material is between 1% and 99% crystalline.

18. The method of claim 2, wherein the ionically conductive material has a Young's elastic modulus of at least 1 GPa.

19. The method of claim 2, wherein the second layer comprises an ionically-conductive material and a non-ionically conductive material, and wherein the non-ionically conductive material has a Young's elastic modulus of at least 2 times smaller than the modulus of ionically conductive material.

20. The method of claim 13, wherein the non-ionically conductive material comprises a polymer.

21. The method of claim 13, wherein the non-ionically conductive material comprises an inorganic material.

22. The method of claim 2, wherein the second layer has a density of between 1.5 and 6 g/cm³.

23. The method of claim 2, wherein the second layer has a porosity of less than about 5%.

24. The method of claim 2, wherein the first layer comprises a polymer.

25. The method of claim 24, wherein the polymer is a polymer gel or forms polymer gel when exposed to liquid electrolyte.

26. The method of claim 2, wherein the first layer comprises lithium metal.

27. The method of claim 2, wherein the first layer is a separator.

28. The method of claim 2, wherein the first layer is porous.

29. The method of claim 2, wherein the first layer is non-porous.

30. The method of claim 2, comprising exposing the second layer to a liquid electrolyte.

* * * * *

UNITED STATES PATENT AND TRADEMARK OFFICE
CERTIFICATE OF CORRECTION

PATENT NO. : 10,535,902 B2
APPLICATION NO. : 15/277244
DATED : January 14, 2020
INVENTOR(S) : Michael G. Laramie et al.

Page 1 of 1

It is certified that error appears in the above-identified patent and that said Letters Patent is hereby corrected as shown below:

On the Title Page

Item (73), "Sion Power Corporation, Tucson, AZ (US); BASF SE, Ludwigshafen (DE)" should be "Sion Power Corporation, Tucson, AZ (US)"

Signed and Sealed this
Twentieth Day of October, 2020

Andrei Iancu
*Director of the United States Patent and Trademark Office*